US012781567B2

(12) United States Patent
Stout et al.

(10) Patent No.: US 12,781,567 B2
(45) **Date of Patent: *Nov. 3, 2026**

(54) LEVELING ASSEMBLY FOR ADJUSTING THE LEVELNESS OF A BOTTOM RAIL OF A COVERING FOR AN ARCHITECTURAL STRUCTURE

(71) Applicant: Levolor, Inc., Atlanta, GA (US)

(72) Inventors: Jeffrey Travis Stout, Sandy Springs, GA (US); Alberto Alexander Gonzalez, Lawrenceville, GA (US); Justin Lin Zhu, Lawrenceville, GA (US); Kevin Macaraeg Daffon, Marietta, GA (US)

(73) Assignee: Levolor, Inc., Atlanta, GA (US)

( * ) Notice: Subject to any disclaimer, the term of this patent is extended or adjusted under 35 U.S.C. 154(b) by 283 days.

This patent is subject to a terminal disclaimer.

(21) Appl. No.: 18/394,855

(22) Filed: Dec. 22, 2023

(65) Prior Publication Data

US 2024/0133235 A1 Apr. 25, 2024

Related U.S. Application Data

(63) Continuation of application No. 17/159,532, filed on Jan. 27, 2021, now Pat. No. 11,891,855.

(Continued)

(51) Int. Cl.

*E06B 9/322* (2006.01)
*E06B 9/323* (2006.01)
*E06B 9/327* (2006.01)

(52) U.S. Cl.

CPC .............. *E06B 9/327* (2013.01); *E06B 9/322* (2013.01); *E06B 9/323* (2013.01)

(58) Field of Classification Search

CPC .......... E06B 9/327; E06B 9/322; E06B 9/326; E06B 9/38; E06B 9/388; E06B 9/323; E06B 2009/3222; E06B 9/382

See application file for complete search history.

(56) References Cited

U.S. PATENT DOCUMENTS 3,280,890 A 10/1966 Preziozi
4,557,309 A 12/1985 Judkins (Continued)

FOREIGN PATENT DOCUMENTS

EP 0892144 1/1999
EP 3330476 6/2018

(Continued)

*Primary Examiner* — Abe Massad
*Assistant Examiner* — Jeremy C Ramsey
(74) *Attorney, Agent, or Firm* — Dority & Manning, P.A.

(57) ABSTRACT

In one aspect, a leveling assembly for adjusting the levelness or skew angle of a bottom rail of a covering for an architectural structure includes at least one movable or slideable component configured to be moved or slid laterally relative to the bottom rail or a headrail of the covering to adjust the length(s) along which one or more of the lift cords extend within the bottom rail or headrail, which, in turn, adjusts the effective length of such lift cord(s) defined between the bottom rail and the headrail of the covering. Such adjustment of the effective length(s) of the lift cord(s) results in the horizontal orientation or skew angle of the bottom rail being varied, thereby allowing the levelness of the bottom rail to be adjusted, as desired.

21 Claims, 21 Drawing Sheets

Related U.S. Application Data

(60) Provisional application No. 62/966,707, filed on Jan. 28, 2020.

(56) References Cited

U.S. PATENT DOCUMENTS

| | | | |
|---|---|---|---|
| 4,673,018 A | 6/1987 | Judkins | |
| 4,727,921 A | 3/1988 | Vecchiarelli | |
| 4,762,159 A | 8/1988 | Ford | |
| 4,825,929 A | 5/1989 | Haines | |
| 4,842,034 A | 6/1989 | Haines | |
| 5,078,195 A | 1/1992 | Schön | |
| 5,127,458 A | 7/1992 | Schaefer et al. | |
| 5,597,027 A | 1/1997 | Simon et al. | |
| 5,655,590 A | 8/1997 | Bryant | |
| 5,769,143 A | 6/1998 | Morgan et al. | |
| 5,927,366 A | 7/1999 | Bryant | |
| 6,053,236 A | 4/2000 | Judkins et al. | |
| 6,059,004 A * | 5/2000 | Oskam | E06B 9/262 160/84.01 |
| 6,062,292 A | 5/2000 | Bryant | |
| 6,085,823 A | 7/2000 | Oskam | |
| 6,095,222 A | 8/2000 | Voss | |
| 6,550,522 B1 | 4/2003 | Lennon et al. | |
| 6,758,258 B1 | 7/2004 | Nien | |
| 6,796,360 B2 | 9/2004 | Ferrie et al. | |
| 7,108,038 B2 | 9/2006 | Welfonder | |
| 7,311,132 B2 | 12/2007 | Corey et al. | |
| D605,885 S | 12/2009 | Judkins | |
| 7,766,068 B2 | 8/2010 | Andersen | |
| 7,832,450 B2 | 11/2010 | Brace et al. | |
| 7,993,086 B2 | 8/2011 | Kruse et al. | |
| D693,598 S | 11/2013 | Strand | |
| 8,857,494 B2 | 10/2014 | Kirby et al. | |
| 8,931,540 B2 | 1/2015 | Filko | |
| 8,944,135 B2 | 2/2015 | Spray | |
| 9,212,519 B2 | 12/2015 | Vrooman | |
| 9,458,664 B2 | 10/2016 | Wen et al. | |
| 9,863,185 B2 | 1/2018 | Franssen | |
| 9,879,476 B2 | 1/2018 | Sung et al. | |
| 10,119,329 B2 * | 11/2018 | Anderson | E06B 9/304 |
| 10,392,859 B2 | 8/2019 | Church et al. | |
| 10,641,038 B2 | 5/2020 | Franssen | |
| 11,473,369 B2 | 10/2022 | Chen | |
| 11,505,989 B1 * | 11/2022 | Chiang | E06B 9/38 |
| 2004/0177933 A1 | 9/2004 | Hillman et al. | |
| 2005/0224191 A1 | 10/2005 | Nien | |
| 2006/0130980 A1 * | 6/2006 | Gromotka | E06B 9/264 160/107 |
| 2006/0169418 A1 | 8/2006 | Gromotka et al. | |
| 2006/0243399 A1 | 11/2006 | Nien et al. | |
| 2007/0068636 A1 | 3/2007 | Yu et al. | |
| 2007/0089839 A1 | 4/2007 | Collum et al. | |
| 2008/0038086 A1 | 2/2008 | Dietz et al. | |
| 2008/0083508 A1 | 4/2008 | Rossato | |
| 2008/0121350 A1 | 5/2008 | Cheng | |
| 2008/0149279 A1 | 6/2008 | Leighty et al. | |
| 2008/0173409 A1 | 7/2008 | Robertson et al. | |
| 2009/0032203 A1 | 2/2009 | Liang | |
| 2009/0038762 A1 | 2/2009 | Hsieh | |
| 2011/0265963 A1 | 11/2011 | Drew et al. | |
| 2012/0312486 A1 * | 12/2012 | Spray | E06B 9/388 24/115 L |
| 2013/0192774 A1 | 8/2013 | Lin | |
| 2013/0333849 A1 | 12/2013 | Kirby et al. | |
| 2014/0262079 A1 * | 9/2014 | Filko | E06B 9/326 160/311 |
| 2014/0374034 A1 | 12/2014 | Corey et al. | |
| 2015/0020980 A1 | 1/2015 | Franssen | |
| 2015/0240558 A1 * | 8/2015 | Vrooman | E06B 9/388 160/168.1 R |
| 2018/0155983 A1 | 6/2018 | Franssen et al. | |
| 2023/0235625 A1 * | 7/2023 | Blackburn | F16G 11/14 24/115 R |

FOREIGN PATENT DOCUMENTS

| | | |
|---|---|---|
| GB | 2464824 | 5/2010 |
| WO | WO 2011128028 | 10/2011 |

* cited by examiner

LEVELING ASSEMBLY FOR ADJUSTING THE LEVELNESS OF A BOTTOM RAIL OF A COVERING FOR AN ARCHITECTURAL STRUCTURE

CROSS-REFERENCE TO RELATED APPLICATIONS

This application is a continuation of U.S. patent application Ser. No. 17/159,532, filed Jan. 27, 2021, which, in turn, is based upon and claims the right of priority to U.S. Provisional Patent Application No. 62/966,707, filed Jan. 28, 2020, the disclosures of both of which are hereby incorporated by reference herein in their entirety for all purposes.

FIELD

The present disclosure relates generally to coverings for architectural structures and, more particularly, to a leveling assembly for adjusting the levelness of a bottom rail of a covering for an architectural structure, such as a window covering.

BACKGROUND

A covering for an architectural structure, such as a blind or shade for a window or door, typically includes a head rail, a bottom rail, one or more covering elements extending between the head rail and the bottom rail, and at least two lift cords extending from the head rail to the bottom rail to suspend the bottom rail relative to the headrail. The vertical length of each lift cord defined between the headrail and the bottom rail is generally referred to as the "effective length" of the lift cord. In this regard, the effective lengths of the lift cords generally impact the orientation or levelness of the bottom rail relative to the headrail (or relative to a reference horizontal plane). For instance, for a window covering including a pair of lift cords, the bottom rail will generally be skewed or non-level relative to the headrail if the effective length of one of the lift cords is greater than the effective length of the other lift cord. In such instance, it is generally desirable to manufacture/assemble the covering such that the lift cords have the same effective length. However, due to manufacturing tolerances and/or assembly methods, this can be difficult to achieve on a consistent basis. As a result, finished or assembled coverings may be produced that include a bottom rail that is slightly skewed or non-level relative to the headrail when the covering is moved to an extended position.

Accordingly, a leveling assembly for adjusting the levelness of a bottom rail of a covering for an architectural structure would be welcomed in the technology.

BRIEF DESCRIPTION

Aspects and advantages of the present disclosure will be set forth in part in the following description, or may be obvious from the description, or may be learned through practice of the present disclosure.

In one aspect, the present subject matter is directed to a covering for an architectural structure that includes a headrail and a bottom rail extending in a lateral direction between a first lateral end of the bottom rail and a second lateral end of the bottom rail, with the bottom rail being suspended relative to the headrail via first and second lift cords. The first lift cord defines a first effective cord length between the headrail and the bottom rail, and the second lift cord defines a second effective cord length between the headrail and the bottom rail. The covering also includes a lift system component positioned within one of the bottom rail or the headrail, and a leveling assembly positioned at least partially within the one of the bottom rail or the headrail and being coupled to the lift system component such that movement of a portion of the leveling assembly in the lateral direction results in a lateral position of the lift system component being adjusted within the one of the bottom rail or the headrail. The lift system component is coupled to the first and second lift cords such that, as the lateral position of the lift system component is adjusted within the one of the bottom rail or the headrail, at least one of the first effective cord length or the second effective cord length is varied to adjust an orientation of the bottom rail.

In another aspect, the present subject matter is directed to a method for adjusting an orientation of a bottom rail of a covering for an architectural structure. The method includes positioning the bottom rail relative to a headrail of the covering such that the bottom rail is suspended below the headrail via a lift cord, with the lift cord defining an effective cord length between the headrail and the bottom rail. In addition, the method includes adjusting a lateral position of a lift system component disposed within one of the bottom rail or the headrail between opposed lateral ends of the bottom rail to adjust an orientation of the bottom rail, wherein the lift system component is coupled to the lift cord such that, as the lateral position of the lift system component is adjusted within the bottom rail, the cord length of the lift cord is varied in a manner that adjusts the orientation of the bottom rail.

In a further aspect, the present subject matter is directed to a leveling assembly for adjusting an orientation of a bottom rail of a covering for an architectural structure relative to a headrail of the covering. The leveling assembly comprises a first leveling component including a connection portion configured to be coupled to a component of the covering and first and second rail connection arms extending outwardly from the connection portion in a lateral direction. The leveling assembly also includes a second leveling component configured to be coupled to one of the bottom rail or the headrail of the covering, with the second leveling component defining a plurality of pairs of aligned locking channels such that each of the plurality of pairs of aligned locking channels define a respective locking position of a plurality of laterally spaced locking positions. Additionally, the first leveling component includes first and second engagement flanges extending outwardly from the first and second rail connection arms, respectively, such that the first and second engagement flanges are configured to be received within a selected one of the plurality of pairs of aligned locking channels of the rail insert to selectively engage the first leveling component with the second leveling component at the respective locking position. Moreover, the first and second retention arms are configured to be actuated relative to the second leveling component to remove the first and second engagement flanges from the selected one of the plurality of pairs of aligned locking channels and to allow the first leveling component to be moved in the lateral direction relative to the second leveling component for engagement with the second leveling component at a different one of the plurality of laterally spaced locking positions.

In an additional aspect, the present subject matter is directed to a covering for an architectural structure including a headrail and a bottom rail extending in a lateral direction between a first lateral end of the bottom rail and a second lateral end of the bottom rail. The bottom rail is suspended relative to the headrail via a lift cord, with the lift cord defining an effective cord length between the headrail and the bottom rail. The covering further includes a leveling assembly positioned at least partially within one of the bottom rail or the headrail. The leveling assembly includes a first cord post and a second cord post, with the first cord post being movable relative to the second cord post in the lateral direction to adjust a lateral spacing distance defined between the first and second cord posts. The lift cord at least partially wraps around the first and second cord posts as the lift cord extends within the one of the bottom rail or the headrail. Additionally, a travel path of the lift cord through the leveling assembly is configured such that, as the lateral spacing distance defined between the first and second cord posts is adjusted, the effective cord length of the lift cord is varied to adjust an orientation of the bottom rail.

In another aspect, the present subject matter is directed to a method for adjusting an orientation of a bottom rail of a covering for an architectural structure. The method includes positioning the bottom rail relative to a headrail of the covering such that the bottom rail is suspended below the headrail via a lift cord, with the lift cord defining an effective cord length between the headrail and the bottom rail and extending through a leveling assembly positioned at least partially within the bottom rail. The method further includes moving a first cord post of the leveling assembly relative to a second cord post of the leveling assembly to adjust a lateral spacing distance defined between the first and second cord posts of the leveling assembly, with the lift cord at least partially wrapping around the first and second cord posts as the lift cord extends within one of the bottom rail or the headrail. Additionally, a travel path of the lift cord through the leveling assembly is configured such that, as the lateral spacing distance defined between the first and second cord posts is adjusted, the effective cord length of the lift cord is varied to adjust an orientation of the bottom rail.

These and other features, aspects and advantages of the present disclosure will become better understood with reference to the following Detailed Description and appended claims. The accompanying drawings, which are incorporated in and constitute a part of this specification, illustrate embodiments of the present disclosure and, together with the description, serve to explain the principles of the present disclosure.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
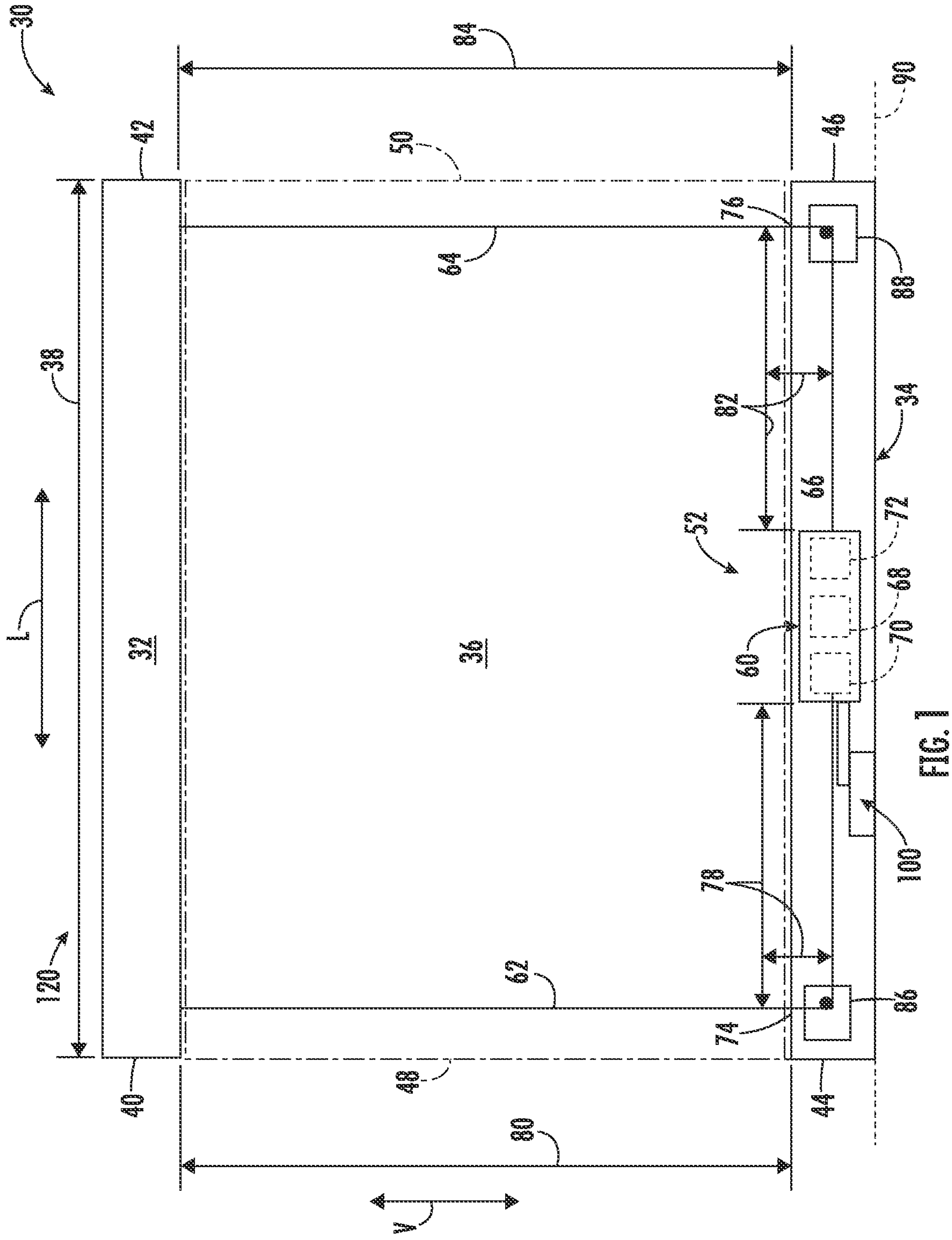
FIG. 1 illustrates a schematic, front view of one embodiment of a covering for an architectural structure in accordance with aspects of the present subject matter, particularly illustrating a leveling assembly provided in operative association with a bottom rail of the covering.

In general, the present subject matter is directed to a leveling assembly for adjusting the levelness or skew angle of a bottom rail of a covering for an architectural feature or structure (referred to herein simply as an architectural "structure" for the sake of convenience without intent to limit), such as a window or door. In accordance with aspects of the present subject matter, the leveling assembly is configured to be provided in operative association with one of the bottom rail or the associated headrail of the covering and/or a component of the covering positioned within such rail (e.g., lift system components of the covering) to allow the orientation of the bottom rail to be adjusted. In several embodiments, the leveling assembly includes at least one movable or slideable component configured to be moved or slid laterally relative to the rail within which the leveling assembly is installed (and/or relative to another component of the leveling assembly) to adjust the length(s) along which one or more of the lift cords extend within the rail, which, in turn, adjusts the effective length of such lift cord(s) defined between the bottom rail and the headrail of the covering. Such adjustment of the effective length(s) of the lift cord(s) results in the horizontal orientation or skew angle of the bottom rail being varied, thereby allowing the levelness of the bottom rail to be adjusted, as desired.

In several embodiments, the leveling assembly is configured to be provided in operative association with a lift system component of the covering positioned to allow the levelness of the bottom rail to be adjusted. For instance, the leveling assembly may be configured to be provided in operative association with a motor of the lift system positioned within bottom rail or the headrail of the covering. Specifically, in one embodiment, the leveling assembly may include both a first leveling component configured to be coupled to a portion of the motor such that the motor moves or slides laterally within the rail with corresponding movement of the first leveling component in the lateral direction and a second leveling component configured to be coupled to or provided in operative association with a portion of the rail such that first leveling component is movable relative to the second leveling component in the lateral direction. In such an embodiment, by actuating or moving the first leveling component in the lateral direction relative to the rail (and the second leveling component coupled thereto), the motor may slide or move laterally with the first leveling component between the opposed lateral ends of the rail, thereby resulting in the effective cord lengths of the lift cords coupled to the motor being varied in a manner that adjusts the levelness or skew angle of the bottom rail.

As will be described below, in one embodiment, the first leveling component may be configured to be selectively engaged with the second leveling component at a selected one of a plurality of locking positions spaced apart laterally along the second leveling component. In such an embodiment, the first leveling component may be configured to be disengaged from the second leveling component to allow the first leveling component to be moved or slid laterally within the associated rail to adjust the lateral position of the motor. In another embodiment, the second leveling component may be configured to be rotated relative to the first leveling component to actuate or cause lateral movement of the first leveling component within the rail. For instance, the leveling assembly may utilize or include a rack-and-pinion-type or cam-type actuation mechanism such that relative rotation of the second leveling component results in lateral movement of the first leveling component within the rail.

In accordance with other aspects of the present subject matter, the leveling assembly may be incorporated within and/or may function as a cord or turn-up cradle of the covering's lift system. Specifically, in one embodiment, the leveling assembly may include first and second cord posts around which a lift cord is configured to at least partially wrap as the lift cord passes through the leveling assembly, with one of the cord posts being movable relative to the other in the lateral direction to adjust a lateral spacing distance defined between the cord posts. In such an embodiment, the travel path of the lift cord through the leveling assembly may be configured or selected such that, as the lateral spacing distance defined between the first and second cord posts is adjusted, the effective cord length of the lift cord is varied, thereby allowing the levelness of the bottom rail to be adjusted.

It should be appreciated that, although the leveling assembly disclosed herein will generally be described with reference to being installed within or otherwise provided in operative association with the bottom rail of a covering, the leveling assembly may, instead, be installed within or otherwise provided in operative association with the headrail of a covering, such as in embodiments in which the lift system components of the covering are installed within the headrail. For instance, similar to its operation within the bottom rail, the disclosed leveling assembly may be provided in operative association with a lift system component(s) positioned within the headrail to allow the effective cord length(s) of the lift cord(s) to be varied, thereby adjusting the levelness of the bottom rail.

Referring now to the drawings, FIG. 1 illustrates a schematic view of one embodiment of a covering 30 for an architectural structure. In general, the covering 30 may be configured to be installed relative to a window, door, or any other suitable architectural structure as may be desired. In one embodiment, the covering 30 may be configured to be mounted relative to an architectural structure to allow the covering 30 to be suspended or supported relative to the architectural structure. It should be understood that the covering 30 is not limited in its particular use as a window or door shade, and may be used in any application as a covering, partition, shade, and/or the like, relative to and/or within any type of architectural structure.

In several embodiments, the covering 30 may be configured as a horizontal-type extendable/retractable covering. For example, in the embodiment shown in FIG. 1, the covering 30 includes a headrail 32, a bottom rail 34, and at least one covering element 36 supported between the headrail 32 and the bottom rail 34. As shown, each of the headrail 32 and bottom rail 34 extends in a longitudinal or lateral direction of the covering (as indicated by arrow L in FIG. 1) across a lateral width 38 of the covering 30. Specifically, the headrail 32 extends laterally between a first lateral end 40 of the headrail 32 and a second lateral end 42 of the headrail 32. Similarly, the bottom rail 34 extends laterally between a first lateral end 44 of the bottom rail 34 and a second lateral end 46 of the bottom rail 34. The covering element(s) 36 is generally configured to extend in the lateral direction L across the lateral width 38 of the covering 30 (e.g., between opposed first and second sides 48, 50 of the covering element(s) 36) and in a vertical direction of the covering 30 (as indicated by arrow V in FIG. 1) between the headrail 32 and the bottom rail 34.

It should be appreciated that the covering element(s) 36 may generally correspond to any suitable covering-type element configured to at least partially cover the adjacent architectural structure when the covering is extended. For instance, in one embodiment, covering element(s) 36 may correspond to a cellular panel or blanket, such as a honeycomb panel or any other suitable cellular-type panel. In another embodiment, the covering element(s) 36 may correspond to a sheet-like covering material, such as a pleated shade material or a shade material(s) used to form a Roman-type shade. In yet another embodiment, the covering element(s) 36 may correspond to a plurality of horizontally disposed parallel slats configured to be supported between the headrail 32 and the bottom rail 34 via one or more cord ladders to form a venetian-type blind.

Additionally, in several embodiments, the covering 30 may include a lift system 52 for moving the covering 30 in the vertical direction V between a lowered or extended position (e.g., as shown in FIG. 1), at which the bottom rail 34 is spaced apart vertically from the headrail 32 such that the covering element(s) 36 at least partially covers the adjacent architectural structure, and a raised or retracted position, at which the bottom rail 34 is positioned adjacent to (or at least closer to) the headrail 32 in the vertical direction V such that the adjacent architectural structure is generally exposed or is otherwise not substantially covered by the associated covering element(s) 36. In general, the lift system 52 may include a plurality of lift system components, such as a lifting device or motor assembly 60 (referred to hereinafter simply as a "motor" for purposes of simplicity and without intent to limit) and at least two lift cords coupled to or other provided in operative association with the motor 60. For instance, in the illustrated embodiment, the lift system 52 includes a pair of lift cords (e.g., a first lift cord 62 and a second lift cord 64), with each lift cord 62, 64 being coupled to the motor 60 and extending between the headrail 32 and the bottom rail 34 to allow the bottom rail 34 to be raised and lowered relative to the headrail 32 to move the covering 30 between the retracted and extended positions, respectively. However, it should be appreciated that, depending on the lateral width 38 of the covering 30, the lift system 52 may include additional lift cords. For instance, for wider coverings, the lift system 52 may include four, six or more lift cords extending between the headrail 32 and bottom rail 34, with the various lift cords being spaced apart from one another across the lateral width 38 of the covering 30.

It should be appreciated that the motor 60 may generally have any suitable configuration that allows it to function as described herein. In one embodiment, the motor 60 may be configured as a spring motor. In such an embodiment, the motor 60 may, for example, including an outer housing 66 encasing or surrounding a spring motor element 68. The spring motor element 68 may, in turn, be coupled to lift spools (e.g., first and second lift spools 70, 72 positioned within the housing 66) to allow the spring motor element 68 to drive the lift spools 70, 72 when the covering 30 is being moved (e.g., towards the extended position). For instance, the spring motor element 68 may be coupled to the lift spools 70, 72 via a lift rod (not shown) or similar drive rod or shaft.

In several embodiments, the motor 60 may be housed or positioned within the bottom rail 34. For instance, in the illustrated embodiment, the motor 60 is positioned within the bottom rail 34 between the opposed lateral ends 44, 46 of the rail 34 (e.g., at a generally centralized location within the bottom rail 34 along the lateral direction L), with each lift cord 62, 64 extending laterally from the motor 60 towards a respective lateral end 44, 46 of the bottom rail 34 before exiting the rail 34 and extending vertically towards the headrail 32. Specifically, as shown in FIG. 1, the first lift cord 62 extends laterally/vertically within the bottom rail 34 from the motor 60 to a first cord exit location 74 defined adjacent to the first lateral end 44 of the bottom rail 34 such that the first lift cord 62 defines a first cord travel length 78 corresponding to the total length of the first lift cord 62 extending within the bottom rail 34 between the motor 60 and the first cord exit location 74 (e.g., a summation of the lateral and vertical cords lengths within the bottom rail 34). The first lift cord 62 then extends vertically from the bottom rail 34 to the headrail 32 such that the lift cord 62 defines a first vertical or effective length 80 between the headrail 32 and bottom rail 34. As such, the summation of the first cord travel length 78 and the first effective length 80 generally corresponds to the overall length of the first lift cord 62 defined between the motor 60 and the headrail 32. Similarly, as shown in FIG. 1, the second lift cord 64 extends laterally/vertically within the bottom rail 34 from the motor 60 to a second cord exit location 76 defined adjacent to the second lateral end 46 of the bottom rail 34 such that the second lift cord 64 defines a second cord travel length 82 corresponding to the total length of the second lift cord 64 extending within the bottom rail 34 between the motor 60 and the second cord exit location 76 (e.g., a summation of the lateral and vertical cords lengths within the bottom rail 34). The second lift cord 64 then extends vertically from the bottom rail 34 to the headrail 32 such that the lift cord 64 defines a second vertical or effective length 84 between the headrail 32 and bottom rail 34. As such, the summation of the second cord travel length 82 and the second effective length 84 generally corresponds to the overall length of the second lift cord 64 defined between the motor 60 and the headrail 32.

Additionally, as shown in FIG. 1, the lift system 52 may also include first and second turn-up or cord cradles 86, 88 provided within the bottom rail 34 adjacent to the first and second lateral ends 44, 46 of the rail 34, respectively, to assist in guiding each lift cord 62, 64 relative to its corresponding exit location 74, 76. Each cord cradle 86, 88 may, for example, include one or more components (e.g., a guide pin(s) and/or roller(s)) positioned at the location at which the associated lift cord 62, 64 turns vertically upward towards its respective exit location 74, 76, thereby reducing the amount of friction and noise associated with operation of the covering 30 as the lift cords 62, 64 passes by such locations during extension and retraction of the covering 30.

In several embodiments, the lift cords 62, 64 may be configured to be wound around or unwound from components of the lift system 52 (e.g., the lift spools 70, 72 incorporated within or otherwise provided in operative association with the motor 60) as the bottom rail 34 is being raised and lowered relative to the headrail 32. For instance, when extending the covering 30, the lift cords 62, 64 may generally unwind from the lift spools 70, 72 to allow the effective cord lengths 80, 84 of the first and second lift cords 62, 64 to be increased as the bottom rail 34 is moved away from the headrail 32. Similarly, when retracting the covering 30, the lift cords 62, 64 may generally wind around the lift spools 70, 72 to allow the effective cord lengths 80, 84 of the first and second lift cords 62, 64 to be decreased as the bottom rail 34 is moved towards from the headrail 33. In embodiments in which the motor 60 is configured as a spring motor, the spring motor element 68 may be configured to store energy as the bottom rail 34 is lowered relative to the headrail 32 (and as the lift cords 62, 64 unwind from the associated lift spools 70, 72) and release such energy when the bottom rail 34 is being raised relative to the headrail 32 (and as the lift cords 62, 64 wind around the associated lift spools 70, 72) to assist in moving the covering 30 to its retracted position. For instance, as the bottom rail 34 is being raised relative to the headrail 32, the motor 60 may transfer a driving torque (via the spring motor element 68) to the lift spools 70, 72 (e.g., via a lift rod (not shown)) for rotationally driving the spools 70, 72 in a manner that causes each lift cord 62, 64 to be wound around its respective lift spool 70, 72. In contrast, as the bottom rail 34 is being lowered relative to the headrail 32, the lift spools 70, 72 may rotate the opposite direction as the lift cords 62, 64 are being unwound from the spools 70, 72, thereby allowing the spring motor element 68 to store energy.

As shown in FIG. 1, when the effective cord lengths 80, 84 of the first and second lift cords 62, 64 are equal or substantially equal to each other, the bottom rail 34 will generally have a level orientation relative to a horizontal reference plane 90. Specifically, at such level orientation, a skew angle 92 (FIGS. 2 and 3) of the bottom rail 34 defined between the horizontal reference plane 90 and a reference rail plane 94 (FIGS. 2 and 3) defined by the bottom rail 34 (e.g., along the bottom side of the rail 34) will generally be equal to zero. However, due to manufacturing and/or assembly tolerances or other factors, the effective cord length 80, 84 of one of the lift cords 62, 64 may be greater than the effective cord length 80, 84 of the other lift cord 62, 64 when the covering 30 is at the extended position. In such instance, the difference in the effective cord lengths 80, 84 results in the bottom rail 34 having a non-level orientation or non-zero skew angle relative to the horizontal reference plane 90.

Figure 2:
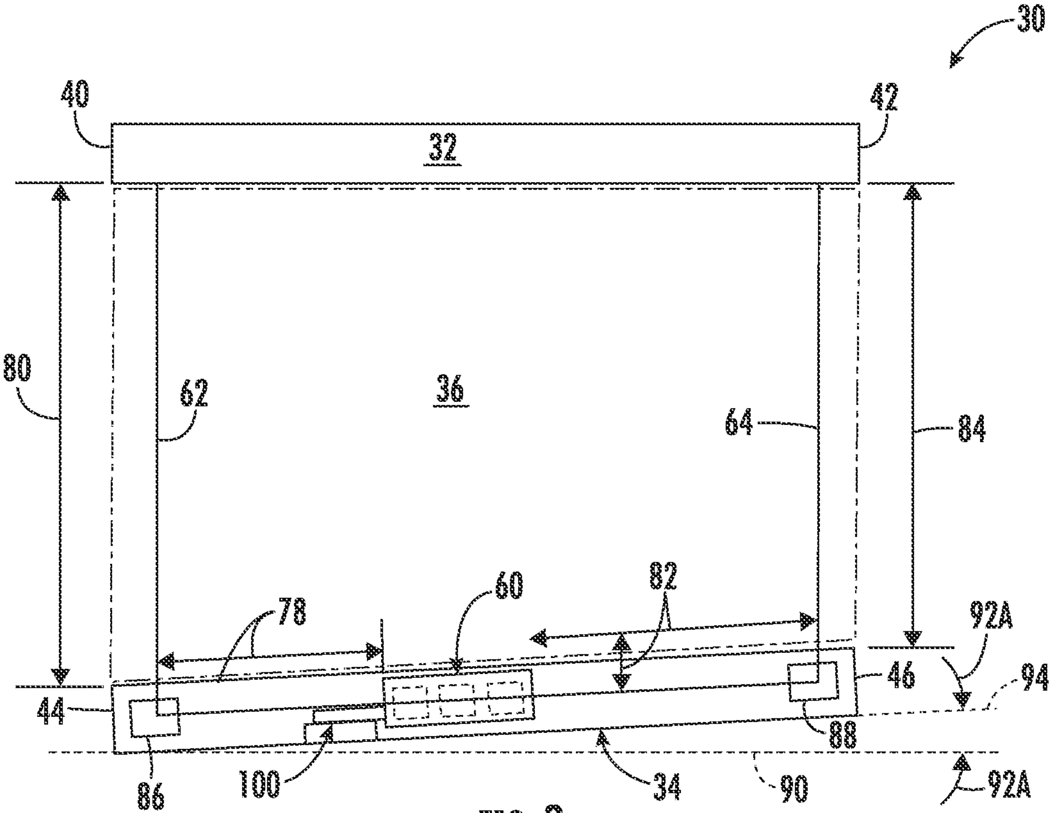
FIG. 2 illustrates another schematic, front view of the covering shown in FIG. 1, particularly illustrating the bottom rail in a first skewed position relative to the level orientation shown in FIG. 1.
Figure 3:
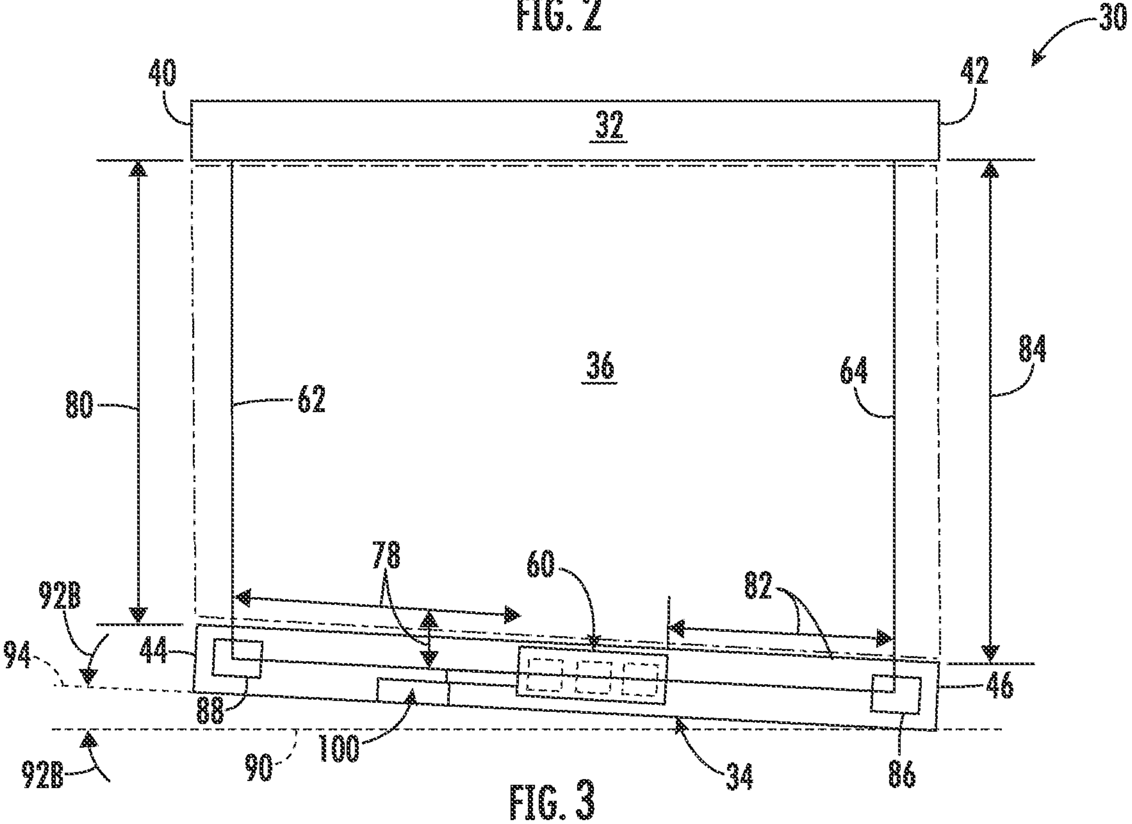
FIG. 3 illustrates a further schematic, front view of the covering shown in FIG. 1, particularly illustrating the bottom rail in a second skewed position relative to the level orientation shown in FIG. 1.

For instance, FIGS. 2 and 3 illustrate example views of the covering 30 shown in FIG. 1 with the bottom rail 34 having different non-level orientations. Specifically, as shown in the example view of FIG. 2, the first lift cord 62 defines an effective cord length 80 between the headrail 32 and the bottom rail 34 that is greater than the effective cord length 84 defined by the second lift cord 64 between the headrail 32 and the bottom rail 34. This increased first effective cord length 80 results in the first lateral end 44 of the bottom rail 34 being positioned below the second lateral end 46 of the bottom rail 34, which, in turn, results in the bottom rail 34 being skewed counter-clockwise at a first skew angle 92A relative to the horizontal reference plane 90. Similarly, in the example view of FIG. 3, the second lift cord 64 defines an effective cord length 84 between the headrail 32 and the bottom rail 34 that is greater than the effective cord length 80 defined by the first lift cord 62 between the headrail 32 and the bottom rail 34. This increased second effective cord length 84 results in the second lateral end 46 of the bottom rail 34 being positioned below the first lateral end 44 of the bottom rail 34, which, in turn, results in the bottom rail 34 being skewed clockwise at a second skew angle 92B relative to the horizontal reference plane 90.

Referring back to FIG. 1, in several embodiments, the disclosed covering 30 further includes a leveling assembly 100 to allow the levelness or skew angle 92 of the bottom rail 34 to be adjusted. Specifically, in several embodiments, the leveling assembly 100 may be configured to adjust the effective cord length 80, 84 of one or both of the lift cords 62, 64 by varying the cord travel length(s) 78, 82 along which such lift cord(s) 62, 64 extends within the bottom rail 34. For instance, given a fixed overall cord length defined between the motor 60 and the headrail 32 for the first lift cord 62 when the covering 30 is at the extended position (e.g., the fixed overall length being equal to the summation of the first effective cord length 80 and the first cord travel length 78), an increase in the cord travel length 78 along which the first lift cord 62 extends within the bottom rail 34 between the motor 60 and the first cord exit location 74 results in the first effective cord length 80 being reduced, thereby raising the first lateral end 44 of the bottom rail 34 relative to the headrail 32. Similarly, a reduction in the cord travel length 78 along which the first lift cord 62 extends within the bottom rail 34 between the motor 60 and the first cord exit location 74 results in the first effective cord length 80 being increased, thereby lowering the first lateral end 44 of the bottom rail 34 relative to the headrail 32. Thus, by varying the cord lengths of one or both of the lift cords 62, 64, the levelness of the bottom rail 34 can be adjusted.

In several embodiments, the leveling assembly 100 is configured to be provided in operative association with a component of the lift system 52 to facilitate adjustments in the levelness of the bottom rail 34. For instance, as shown in the illustrated embodiment of FIG. 1, the leveling assembly 100 is provided in operative association with the motor 60 to allow the motor 60 to be moved or slid laterally within the bottom rail 34 between the opposed lateral ends 44, 46 of the rail 34. Given that each lift cord 62, 64 is coupled to the motor 60 (e.g., via the lift spools 70, 72) and has a fixed length between the motor 60 and the headrail 32 when the covering 30 is at an extended position, such lateral movement of the motor 60 within the bottom rail 34 results in the effective cord lengths 80, 84 of the lift cords 62, 64 being adjusted. For example, FIG. 2 illustrates the orientation of the bottom rail 34 after the disclosed leveling assembly 100 has been used to slide the motor 60 from the centralized position shown in FIG. 1 towards the first lateral end 44 of the bottom rail 34. Such movement of the motor 60 results in counter-clockwise skewing of the bottom rail 34 as the first lateral end 44 of the bottom rail 34 moves downward away from the headrail 32 and the second lateral end 46 of the bottom rail 34 moves upwardly towards the headrail 32. Specifically, as the motor 60 is moved towards the first lateral end 44 of the bottom rail 34, the first cord travel length 78 along which the first lift cord 62 extends within the bottom rail 34 decreases (thereby causing a corresponding increase in the first effective length 80 and, thus, lowering the first lateral end 44 of the bottom rail 34 relative to the headrail 32), while the second cord travel length 82 along which the second lift cord 64 extends within the bottom rail 34 increases (thereby causing a corresponding decrease in the second effective length 84 and, thus, raising the second lateral end 46 of the bottom rail 34 relative to the headrail 32). Accordingly, when the bottom rail 34 is skewed in the clockwise direction (e.g., the orientation shown in FIG. 3), the leveling assembly 100 can be used to slide or move the motor 60 laterally towards the first lateral end 44 of the bottom rail 34 to adjust the orientation of the bottom rail 34 back towards the level orientation (e.g., the orientation shown in FIG. 1).

Similarly, FIG. 3 illustrates the orientation of the bottom rail 34 after the disclosed leveling assembly 100 has been used to slide the motor 60 from the centralized position shown in FIG. 1 towards the second lateral end 46 of the bottom rail 34. Such movement of the motor 60 results in clockwise skewing of the bottom rail 34 as the first lateral end 44 of the bottom rail 34 moves upwardly towards the headrail 32 and the second lateral end 46 of the bottom rail 34 moves downwardly away from the headrail 32. Specifically, as the motor 60 is moved laterally towards the second lateral end 46 of the bottom rail 34, the first cord travel length 78 along which the first lift cord 62 extends within the bottom rail 34 increases (thereby causing a corresponding decrease in the first effective length 80 and, thus, raising the first lateral end 44 of the bottom rail 34 relative to the headrail 32), while the second cord travel length 82 along which the second lift cord 64 extends within the bottom rail 34 decreases (thereby causing a corresponding increase in the second effective length 84 and, thus, lowering the second lateral end 46 of the bottom rail 34 relative to the headrail 32). Accordingly, when the bottom rail 34 is skewed in the counter-clockwise direction (e.g., the orientation shown in FIG. 2), the leveling assembly 100 can be used to slide or move the motor 60 laterally towards the second lateral end 46 of the bottom rail 34 to adjust the orientation of the bottom rail 34 back towards the level orientation (e.g., the orientation shown in FIG. 1).

It should be appreciated that, in accordance with aspects of the present subject matter, embodiments of the disclosed leveling assembly may also be used to level the bottom rail 34 without moving or sliding the motor 60 between the opposed lateral ends 44, 46 of the bottom rail 34. For instance, as will be described below with reference to FIGS. 24-29, the leveling assembly may, in one embodiment, be configured as or form part of one of the cord cradles 86, 88 of the lift system 52. In such an embodiment, the leveling assembly may be used to vary the cord length of the associated lift cord 62, 64 without adjusting the position of the motor 60 within the bottom rail 34.

It should also be appreciated that, although the lift system components and leveling assembly 100 of the covering 30 of the illustrated embodiment shown in FIGS. 1-3 are positioned within or otherwise provided in operative association with the bottom rail 34, such components may, instead, be positioned within or otherwise provided in operative association with the headrail 32. For instance, in one embodiment, the motor 60 and cord cradles 86, 88 may be positioned within the headrail 32, with the lift cords 62, 64 extending from the motor 60 within the headrail 32 to the cord cradles 86, 88 before turning down and extending towards the bottom rail 34. In such an embodiment, the leveling assembly 100 may be provided in operative association with the headrail 32, such as by being positioned within the headrail 32 and coupled to the motor 60, to allow the effective cord lengths 80, 84 of the lift cords 62, 64 to be adjusted to adjust the levelness of the bottom rail 34. Thus, it should be appreciated that the various embodiments of the leveling assembly 100 described herein, such as the embodiments described below with reference to FIGS. 4-23, are equally applicable to use of the leveling assembly 100 within the headrail 32 and the description of such embodiments should not be interpreted as being limited to use of the leveling assembly 100 in association with the bottom rail 34.

Figure 4:
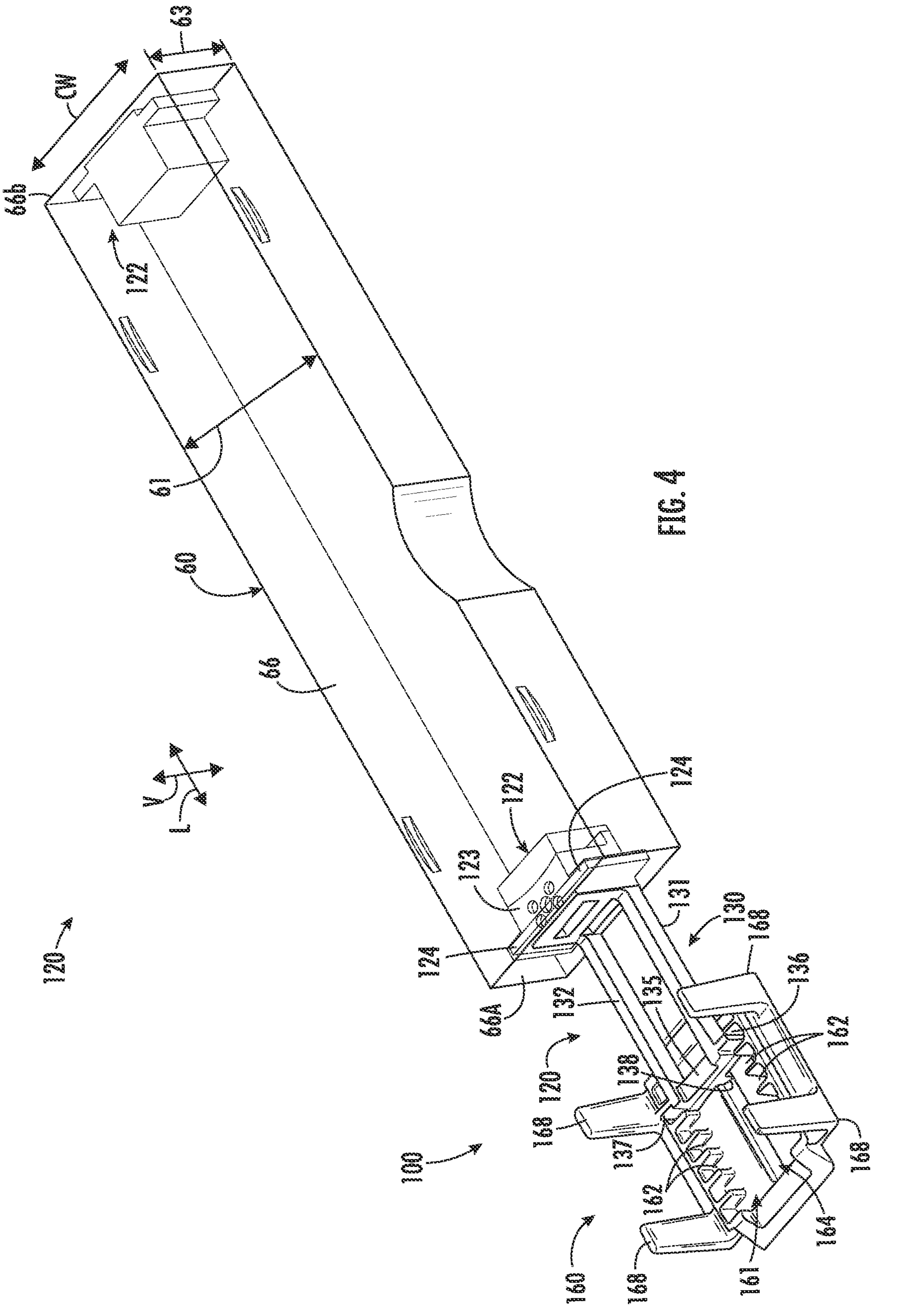
FIG. 4 illustrates a perspective view of one embodiment of a leveling assembly suitable for use within a covering for an architectural structure in accordance with aspects of the present subject matter, particularly illustrating a motor slide and a rail insert of the leveling assembly positioned relative to an associated motor.
Figure 5:
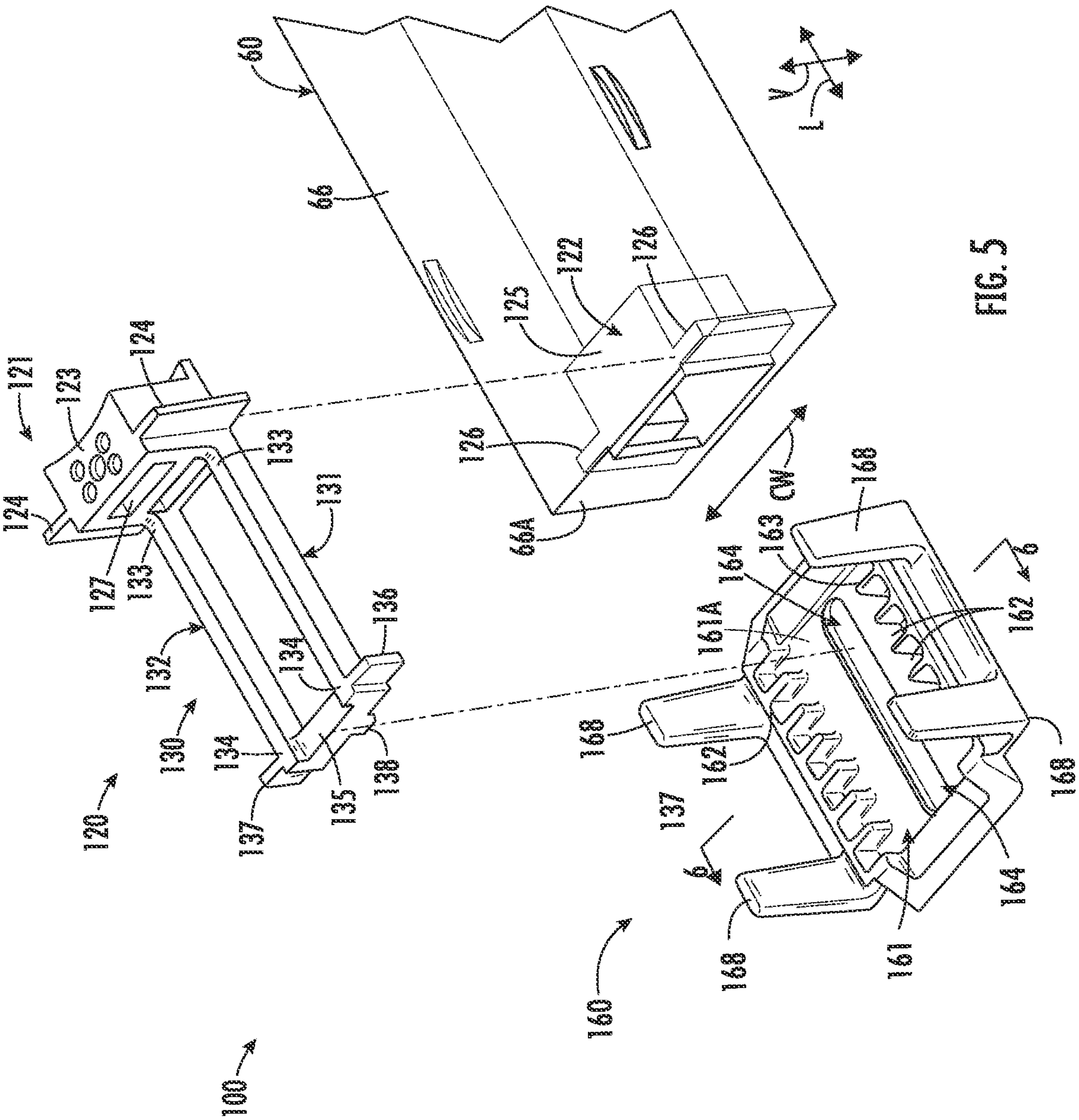
FIG. 5 illustrates another perspective view of the components shown in FIG. 4 (but only a partial view of the motor), with the motor slide of the leveling assembly exploded away from both the rail insert of the leveling assembly and the motor.
Figure 6:
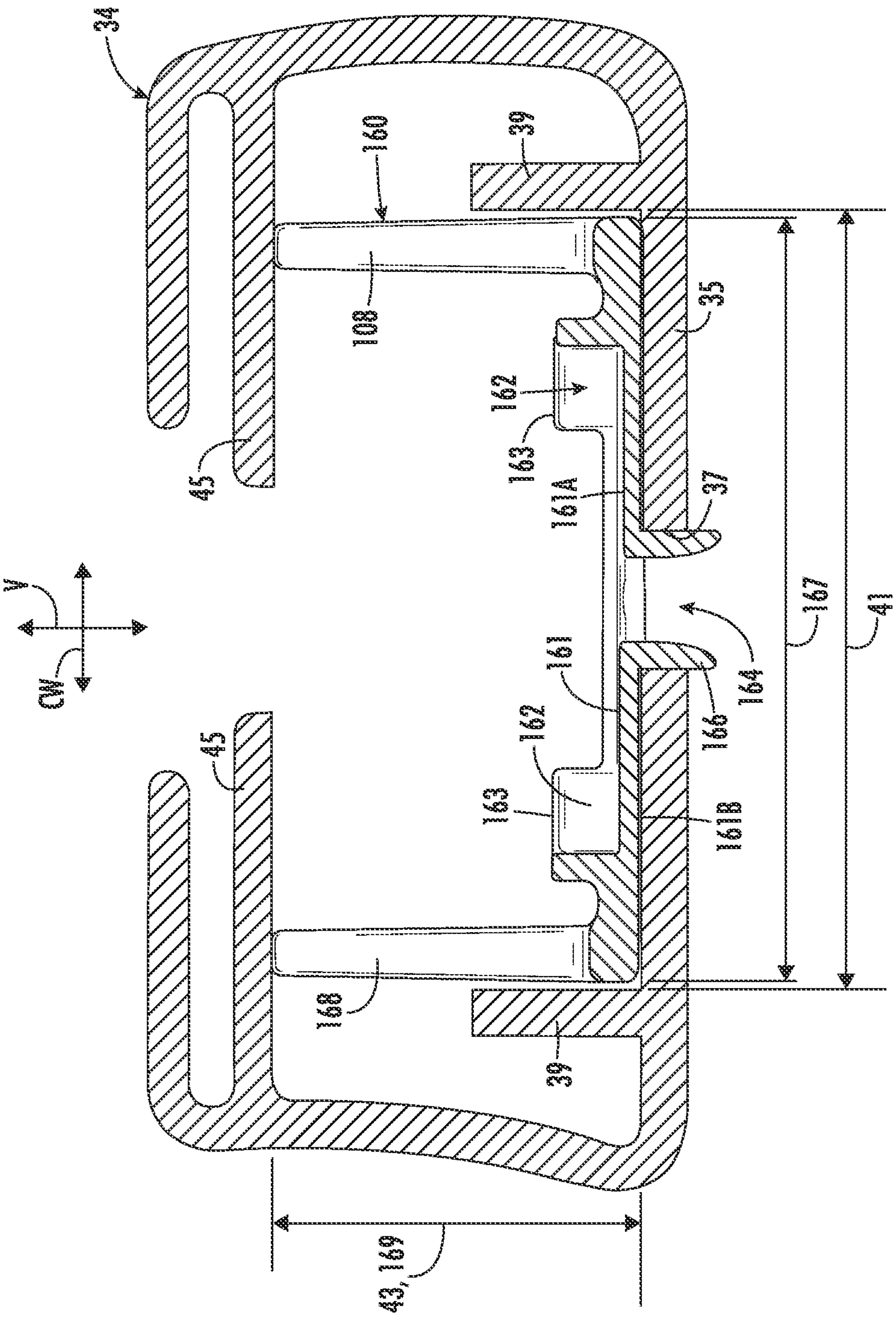
FIG. 6 illustrates a cross-sectional view of the rail insert shown in FIG. 5 as installed within an associated bottom rail and taken from the perspective of line 6-6 shown in FIG. 5.
Figure 7:
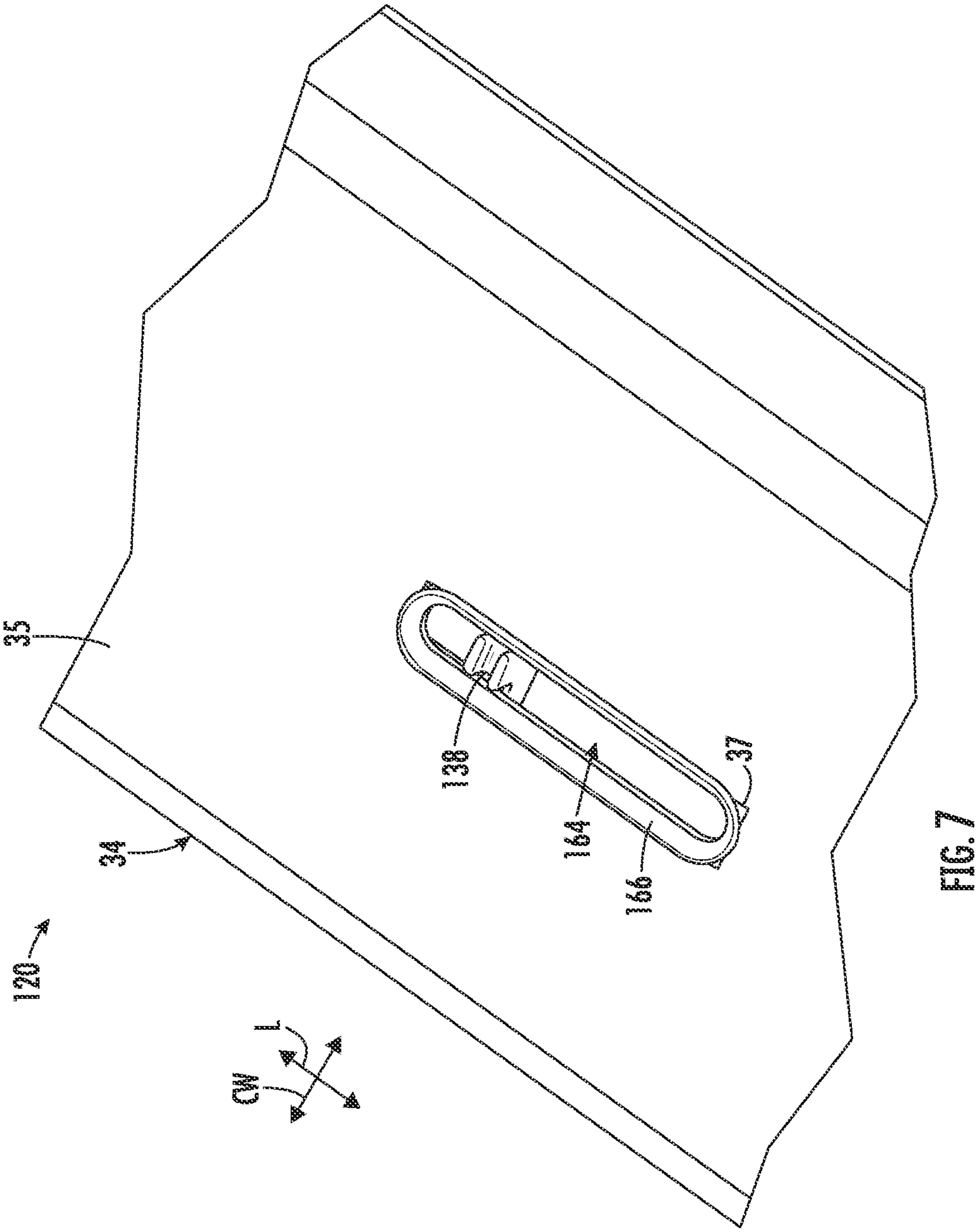
FIG. 7 illustrates a bottom perspective view of the bottom rail shown in FIG. 6 with both the motor slide and the rail insert of the leveling assembly installed therein, particularly illustrating adjustment features of the leveling assembly positioned relative to a bottom wall of the rail.

Referring now to FIGS. 4-7, one embodiment of the leveling assembly 100 described above with reference to FIGS. 1-3 is illustrated in accordance with aspects of the present subject matter. Specifically, FIG. 4 illustrates a perspective view of a first leveling component or slide 120 and a second leveling component or rail insert 160 of the leveling assembly 100 positioned relative to an associated motor (e.g., the motor 60 of the covering 30 shown in FIGS. 1-3), while FIG. 5 illustrates another perspective view of the components shown in FIG. 4 (but only a partial view of the motor 60) with the slide 120 of the leveling assembly 100 exploded away from both the rail insert 160 of the leveling assembly 100 and the motor 60. FIG. 6 illustrates a cross-sectional view of the rail insert 160 as installed within an associated bottom rail (e.g., the bottom rail 34 of the covering 30 shown in FIGS. 1-3) and taken from the perspective of line 6-6 shown in FIG. 5. Additionally, FIG. 7 illustrates a bottom perspective view of the bottom rail 34 shown in FIG. 6 with both the slide 120 and the rail insert 160 of the leveling assembly 100 installed therein, particularly illustrating adjustment features of the leveling assembly 100 positioned relative to a bottom wall 35 of the rail 34. For purposes of discussion, the leveling assembly 100 of FIGS. 4-7 will generally be described with reference to the covering 30 shown in FIGS. 1-3. However, it should be appreciated that the leveling assembly 100 may generally be utilized to adjust the levelness or skew angle of a bottom rail having any other suitable rail configuration and may generally be utilized in association with any other suitable covering having any other suitable covering configuration.

As indicated above, the leveling assembly 100 may, in several embodiments, be configured to be installed within the bottom rail 34 of a covering 30 and coupled to a portion of the motor 60 housed within the rail 34 to allow the motor 60 to be slid or moved laterally along the length of the rail 34 for adjusting the levelness of the rail 34. To allow for such adjustments of the motor position within the bottom rail 34, the leveling assembly 100 may, in several embodiments, include both a first leveling component or slide 120 (referred to hereinafter as the "motor slide" without intent to limit) configured to be coupled to a portion of the motor 60 such that the motor 60 moves or slides laterally within the interior of the rail 34 upon actuation or movement of the motor slide 120 in the lateral direction L and a second leveling component or rail insert 160 configured to be coupled to a portion of the bottom rail 34 such that the slide 120 is moveable relative to both the rail insert 160 and the bottom rail 34 in the lateral direction L. As will be described in greater detail below, the motor slide 120 may be configured to be selectively engaged with the rail insert 160 at one of a plurality of laterally spaced locking positions defined by the rail insert 160 to set or fix the lateral position of the motor 60 within the bottom rail 34. However, when it is desirable to adjust the levelness or skew angle of the rail 34, the motor slide 120 may be disengaged from the rail insert 160 (e.g., from the current locking position) and moved laterally relative to the rail insert 160 to adjust the lateral position of the motor 60 within the rail 34. Upon moving the motor 60 to the desired position for correcting the levelness of the bottom rail 34, the motor slide 120 may then be re-engaged with the rail insert 160 (e.g., at a new locking position) to again set or fix the lateral position of the motor 60 within the bottom rail 34.

As shown in FIGS. 4 and 5, the motor slide 120 of the leveling assembly 100 generally incudes a motor connection portion 121 configured to be coupled to the motor 60. In several embodiments, the motor connection portion 121 may correspond to an insert configured to be received within a corresponding insertion slot 122 defined by a portion of the motor 60 (e.g., at an adjacent lateral end 66A of the outer housing 66 of the motor 60). In such embodiments, the motor connection portion 121 and the insertion slot 122 may be configured to define complementary shapes so that, when the motor connection portion 121 is received within the insertion slot 122, the motor slide 120 is coupled to the motor 60 in a manner that allows the motor 60 to move or slide laterally within the bottom rail 34 with corresponding motion of the slide 120. For instance, as particularly shown in FIG. 5, the motor connection portion 121 includes a substantially rectangular-shaped insertion block 123 and retention wings or flanges 124 extending outwardly from opposed sides of the insertion block 123 in a crosswise direction of the covering (indicated by arrow CW in FIGS. 4 and 5). In such an embodiment, the insertion slot 122 may define a complementary shape, such as by defining a rectangular-shaped main insertion channel 125 for receiving the insertion block 123 of the motor slide 120 and crosswise retention channels 126 along opposed sides of the main insertion channel 125 for receiving the retention flanges 124 of the motor slide 120. As such, when the motor connection portion 121 of the motor slide 120 is received within the insertion slot 122, the engagement of the retention flanges 124 within the retention channels 126 locks the motor slide 120 together with the motor 60 in the lateral direction L, thereby allowing the slide 120 to be used to laterally push or pull the motor 60 to adjust the motor position within the bottom rail 34.

As shown in FIG. 4, in one embodiment, the motor 60 may be configured to define insertion slots 122 at each of the lateral ends 66A, 66B of the motor housing 66 for receiving the motor connection portion 121 of the motor slide 120. In such an embodiment, the dual insertion slot configuration may allow the leveling assembly 100 to be coupled to either lateral end 66*a*, 66*b* of the motor housing 66, thereby simplifying the manufacturing/assembly process by permitting the motor 60 to be installed within the bottom rail 34 with either end facing the desired position of the leveling assembly 100. Moreover, in certain embodiments, the dual insertion slot configuration may allow the associated covering to include two leveling assemblies 100, with one leveling assembly 100 coupled to each lateral end 66A, 66B of the motor housing 66.

It should be appreciated that, in other embodiments, the motor connection portion 121 of the motor slide 120 may have any other suitable configuration that allows it to be coupled to a portion of the motor 60. For instance, as opposed to being configured as an insert, the motor connection portion 121 may include suitable features for coupling the motor slide 120 to the motor 60 via fasteners, such as by defining fastener openings, mounting flanges, and/or the like. Alternatively, the motor slide 120 may be configured to be coupled to the motor 60 using any other suitable connection means or methodology, such as by configuring the motor connection portion 121 to be adhered to a portion of the motor 60 (e.g., at the adjacent lateral end 66A of the motor housing 66).

It should also be appreciated that, in one embodiment, the motor connection portion 121 of the motor slide 120 may include a pass-through feature for allowing an adjacent lift cord (e.g., the first lift cord 62) to extend through the motor slide 120 and into the interior of the motor housing 66. For instance, as shown in FIG. 5, the insertion block 123 defines a cord channel 127 to allow the lift cord to extend therethrough. Thus, the lift cord may pass through the motor connection portion 121 of the motor slide 120 as the lift cord wraps around and unwraps from its respective lift spool.

Additionally, as shown in FIGS. 4 and 5, the motor slide 120 also includes a rail connection portion 130 extending outwardly from the motor connection portion 121 to facilitate selectively engaging the motor slide 120 with the rail insert 160 of the leveling assembly 100, thereby allowing the motor 60 to be selectively coupled to the bottom rail 34. Specifically, in several embodiments, the rail connection portion 130 includes first and second rail connection arms 131, 132 extending outwardly from the insertion block 123 in the lateral direction L from a proximal end 133 (FIG. 5) of each arm 131, 132 towards an opposed distal end 134 (FIG. 5) of each arm 131, 132, with the distal ends 134 of the first and second arms 131, 132 being coupled or connected together via a connector wall 135 extending in the crosswise direction CW directly between the spaced apart arms 131, 132. In one embodiment, the rail connection arms 131, 132 may be configured to resiliently flex or bow relative to the insertion block 123 of the motor slide 120. For instance, as will be described below, when it is desirable to disengage the motor slide 120 from the rail insert 160, the distal ends 134 of the arms 131, 132 may be pushed away from the rail insert 160 such that the arms 131, 132 resiliently flex or bow upwardly as each arm 131, 132 extends outwardly from the insertion block 123.

Moreover, as shown in the illustrated embodiment, the rail connection portion 130 of the motor slide 120 includes engagement features for allowing the motor slide 120 to be selectively engaged with the rail insert 160. Specifically, as shown in FIGS. 4 and 5, the rail connection portion 130 includes first and engagement flanges 136, 137 extending outwardly in the crosswise direction CW from the distal ends 134 of the first and second arms 131, 132, respectively. In such an embodiment, the engagement flanges 136, 137 may be configured to received within corresponding locking channels 162 defined by the rail insert 160 to lock or fix the lateral position of the motor slide 120 (and, thus, the motor 60) relative to the rail insert 160. For instance, as shown in the illustrated embodiment, the rail insert 160 includes a base plate 161 defining locking channels 162 along opposed sides of the plate 161, with each locking channel 162 being separated from an adjacent locking channel(s) 162 in the lateral direction L by an channel rib(s) or wall(s) 163 (FIGS. 5 and 6) extending outwardly from an upper surface 161A (FIGS. 5 and 6) of the base plate 161. As particularly shown in FIG. 5, each locking channel 162 is generally aligned with an opposed locking channel 162 in the crosswise direction CW such that rail insert 160 includes a plurality of pairs of aligned locking channels 162 spaced apart in the lateral direction from one another by a given lateral spacing. Each opposed pair of aligned locking channels 162 may generally define a discrete lateral position at which the motor slide 120 can be locked or fixed relative to the rail insert 160.

In the illustrated embodiment, the rail insert 160 defines seven pairs of aligned locking channels 162. As such, by moving the motor slide 120 relative to the rail insert 160 to allow the engagement flanges 136, 137 of the motor slide 120 to be received within a different pair of aligned locking channels 162, the lateral position of the motor 60 within the bottom rail 34 may be varied or adjusted in discrete increments associated with the lateral spacing of the locking channels 162. It should be appreciated that, although the rail insert 160 is shown in the illustrated embodiment as including seven pairs of aligned locking channels 162, the rail insert 160 may generally include any suitable number of pairs of aligned locking channels so as to define a corresponding number of discrete lateral positions for locking or fixing the motor slide 120 relative to the rail insert 160, with such aligned channel pairs having any suitable lateral spacing to allow for a desired incremental adjustment of the motor position within the bottom rail 34.

Additionally, in several embodiments, the rail connection portion 130 of the motor slide 120 may include an adjustment feature for allowing the motor slide 120 to be disengaged from the rail insert 160 and moved relative thereto. For instance, as shown in the illustrated embodiment, the rail connection portion 130 includes an adjustment tab 138 extending from the arm connector wall 135 adjacent to the distal ends 134 of the arms 131, 132 for receipt into a corresponding adjustment slot 164 defined in the rail insert 160. Specifically, as shown in FIG. 5, the rail insert 160 includes an adjustment slot 164 defined through the base plate 161 of the insert 160 that extends in the lateral direction L between the opposed pairs of aligned locking channels 162. Thus, when the engagement flanges 136, 137 of the motor slide 120 are received within one of the pairs of aligned locking channels 162, the adjustment tab 138 may be reeved within and extend at least partially through the adjustment slot 164.

Moreover, as will be described in greater detail below, when the rail insert 160 is installed within the bottom rail 34, the adjustment slot 164 of the rail insert 160 is configured to be aligned with a corresponding rail slot 37 (FIGS. 6 and 7) defined through the bottom wall 35 of the rail 34. Thus, as particularly shown in FIG. 7, the adjustment tab 138 of the motor slide 120 may be accessible from the exterior of the bottom rail 34 via the aligned slots 37, 164 to allow the motor slide 120 to be disengaged from the rail insert 160 and slid laterally relative thereto to adjust the lateral position of the motor 60 within the bottom rail 34. For instance, a suitable tool may be engaged with or coupled to the adjustment tab 138 and used to push the tab 138 through the aligned slots 37, 164 and into the interior of the bottom rail 34, which, in turn, results in the engagement flanges 136 of the motor slide 120 being pushed vertically upwardly away from the base plate 161 of the rail insert 160 and out of the corresponding pair of aligned locking channels 162 as the rail connection arms 131, 131 flex or bow upwardly via the actuation force provided by the tool. By coupling the tool to the adjustment tab 138 and pushing the tab 138 (and, thus, the distal ends 134 of the arms 131, 132) upwardly such that the engagement flanges 136, 137 clear the locking channels 162, the tool may then be moved along the aligned slots 37, 164 to adjust the lateral position of the motor slide 120 relative to the rail insert 160. Upon reaching the desired lateral position, the tool may be decoupled from the adjustment tab 138 removed from the aligned slots 37, 164 to allow the engagement flanges 136, 137 of the motor slide 120 to be received within the new pair of aligned locking channels 162 disposed at such lateral position as the rail connection arms 131, 132 flex back downwardly towards the rail insert 160 due to their resilient nature.

As indicated above, the rail insert 160 of the leveling assembly 100 is configured to be coupled to a portion of the bottom rail 34 (e.g., the bottom wall 35 of the rail 34) such that the rail insert 160 is fixed or non-movable relative to the bottom rail 34 in the lateral direction L. For instance, as particularly shown in FIGS. 6 and 7, the rail insert 160 includes a retention lip 166 projecting outwardly from a lower surface 161B of the base plate 161 and extending around the outer perimeter of the adjustment slot 164 such that the lip 166 defines a bottom end of the adjustment slot 164. In such an embodiment, the retention lip 166 may be shaped and/or dimensioned such that, when the lip 166 is pressed through the corresponding rail slot 37 defined through the bottom wall 35 of the rail 34, the lip 166 engages the rail 34 and prevents lateral movement of the rail insert 160 relative to the bottom rail 34. For instance, in one embodiment, the retention lip 166 may be configured to be snapped or press-fit into the rail slot 37 to laterally retain the rail insert 160 relative to the bottom rail 34.

In addition to lateral retention of the rail insert 160 within the bottom rail 34, the insert 160 and/or the rail 34 may also include features and/or structure for retaining the rail insert 160 in the crosswise direction CW and vertical direction V. For instance, as shown in the cross-sectional view of FIG. 6, the rail 34 includes internal vertically extending ribs or walls 39 that are spaced apart from each other within the rail by a crosswise internal rail distance 41. In such an embodiment, a crosswise width 167 of the rail insert 160 may be selected such that the internal vertical walls 39 constrain movement of the rail insert 160 in the crosswise direction CW, such as by selecting the crosswise width 167 of the rail insert 160 to only be slightly smaller than the crosswise internal rail distance 41 defined between the vertical walls 39. Additionally, as shown in FIGS. 4-6, the rail insert 160 includes retention posts 168 extending outwardly from the base plate 161 of the insert 160 that are configured to substantially prevent or constrain movement of the rail insert 160 in the vertical direction V when the insert 160 is installed within the bottom rail 34. For instance, as shown in FIG. 6, the length of each post 168 may be selected such that an overall vertical height 169 of the rail insert 160 (e.g., as defined between the lower surface 161B of the base plate 161 and the distal ends of the posts 168) is only slightly smaller than an interior vertical rail distance 43 defined between the bottom wall 35 of the rail 34 and internal horizontally oriented ribs or walls 45 extending within the rail 34 along the crosswise direction CW.

It should be appreciated that the internal dimensions of the bottom rail 34 (e.g., the internal crosswise distance 41 and the internal vertical distance 43) and/or the outer dimensions of the motor 60 may also be selected to constrain movement of the motor 60 in both the crosswise direction CW and vertical direction V. For instance, in one embodiment, a crosswise width 61 (FIG. 4) and vertical height 63 (FIG. 4) of the outer housing 66 of the motor 60 may be selected to only be slightly smaller than the internal crosswise distance 41 and the internal vertical distance 43, respectively, defined by the rail 34. In such an embodiment, movement of the motor 60 in the crosswise direction CW and vertical direction V may be limited or constrained while still allowing the motor 60 to be slid or moved relative to the bottom rail 34 in the lateral direction L with corresponding lateral movement of the motor slide 120 of the leveling assembly 100.

It should also be appreciated that, although the rail insert 160 is generally shown and described herein as corresponding to a separate component configured to be separately installed within the bottom rail 34, the rail insert 160 may, instead, be formed integrally with the bottom rail 34. For instance, in one embodiment, the structure and/or the features of the rail insert 160, such as the locking channels 162, may be formed integrally with the rail 34, such as by being stamped into the bottom wall 35 of the rail 32, to provide structure for engaging the motor slide 120 of the leveling assembly 100.

Figure 30:
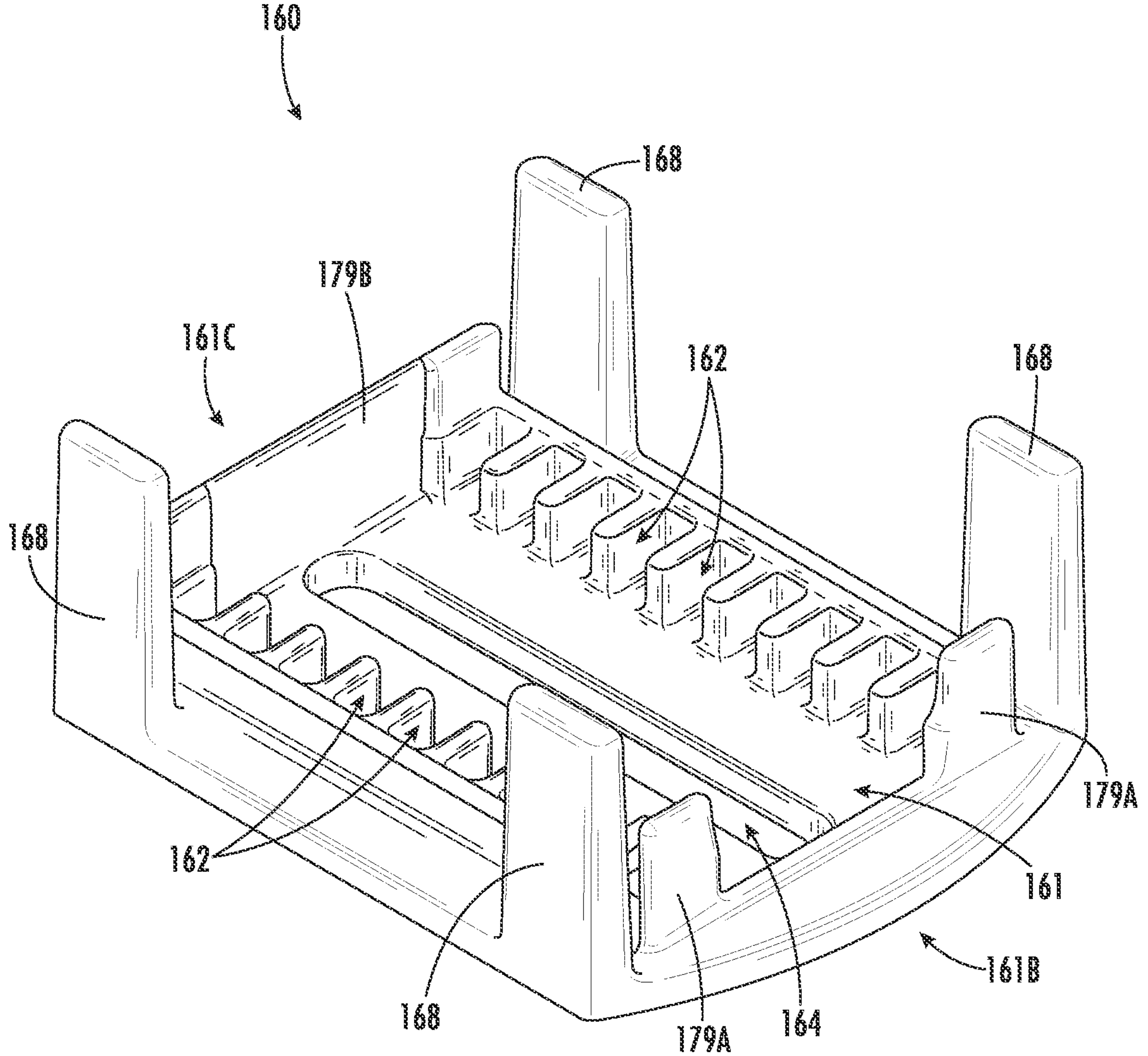
FIG. 30 illustrates a perspective view of an alternative embodiment of a rail insert suitable for use as a component of a leveling assembly in accordance with aspects of the present subject matter, such as the leveling assembly shown in FIGS. 4-10.

Additionally, it should be appreciated that, in one embodiment, the rail insert 160 may also include or incorporate features for preventing the slide 120 from being disengaged or dislodged relative to the insert 160 within the rail 34. For instance, FIG. 30 illustrates an alternative embodiment of the rail insert 160 shown in FIGS. 4-6 in which the insert 160 includes one or more stop walls disposed at each lateral end of the base plate 161 of the insert 160. Specifically, as shown in FIG. 30, the rail insert 160 includes a pair of first stop walls 179A positioned at a first lateral end 161B of the base plate 161 that extend upwardly relative to the locking channels 162 defined by the insert 160. Additionally, the rail insert 160 includes a second stop wall 179B positioned at an opposed second lateral end 161C of the base plate 161 that extends upwardly relative to the locking channels 162. In such an embodiment, the walls 179 may generally function as physical stops for preventing the slide 120 from being laterally disengaged or dislodged relative to the insert 160. For instance, the connection wall 135 and/or the engagement flanges 136, 137 of the motor slide 120 (see FIGS. 4 and 5) may be configured to contact or engage the pair of first stop walls 179A when the slide 120 has been moved relative to the rail insert 160 to or slightly beyond a first end of a lateral adjustment range 170 (see FIGS. 8-10) associated with the slide 120 and may be configured to contact or engage the second stop wall 179B when the slide 120 has been moved relative to the rail insert 160 to or slightly beyond an opposed second end of the slide's lateral adjustment range 170. As such, the stop walls 179 may define a maximum lateral travel range for the slide 120 within the bottom rail 34.

Figure 8:
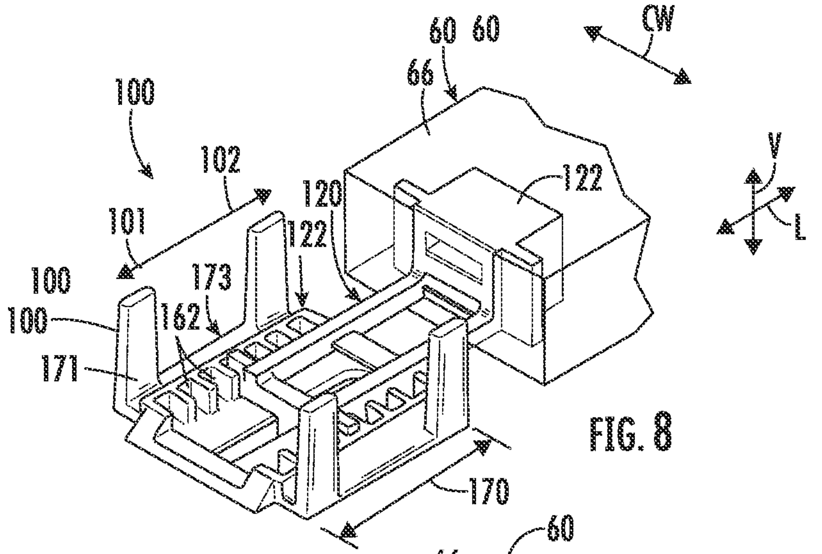
FIG. 8 illustrates a perspective view of the leveling assembly and a portion of the motor shown in FIGS. 4 and 5 in accordance with aspects of the present subject matter, particularly illustrating the motor slide disposed at a central position relative to an associated lateral adjustment range for adjusting the position of the motor slide relative to the rail insert.
Figure 9:
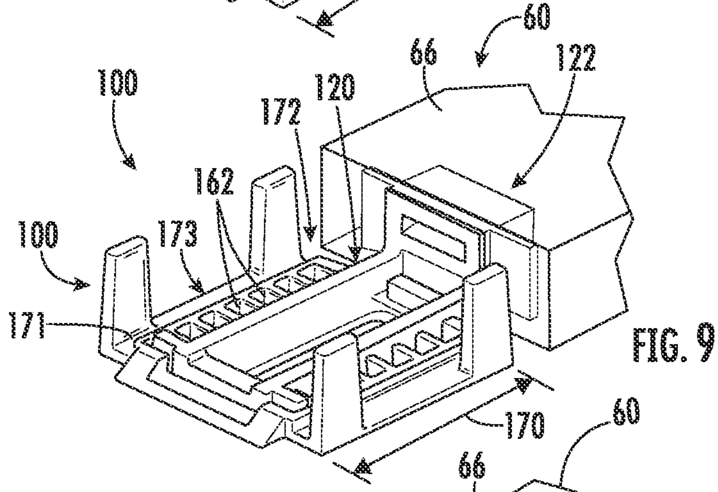
FIG. 9 illustrates another perspective view of the components shown in FIG. 8, particularly illustrating the motor slide disposed at a first end position relative to the associated lateral adjustment range.
Figure 10:
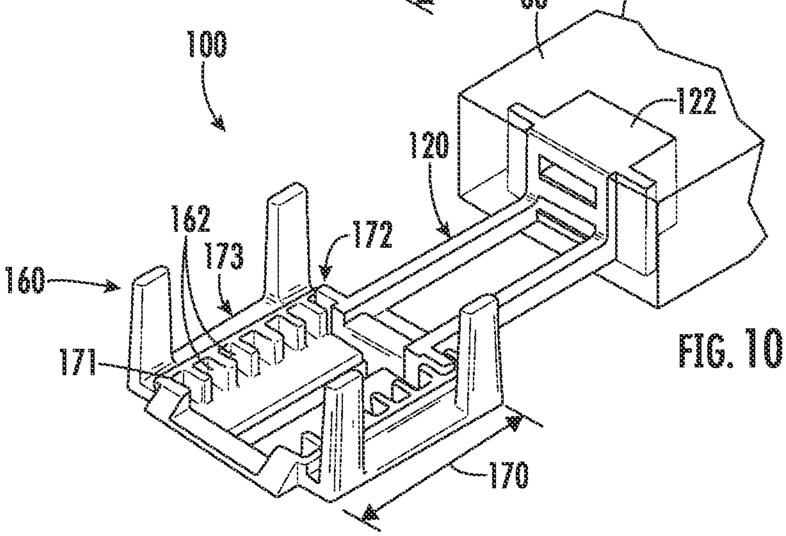
FIG. 10 illustrates a further perspective view of the components shown in FIG. 8, particularly illustrating the motor slide disposed at a second end position relative to the associated lateral adjustment range.

Referring now to FIGS. 8-10, several perspective views of the leveling assembly 100 and a portion of the motor 60 shown in FIGS. 4 and 5 are illustrated in accordance with aspects of the present subject matter, particularly illustrating an example lateral adjustment range 170 for adjusting the position of the motor slide 120 relative to the rail insert 160 (and, thus, the position of the motor 60 relative to the bottom rail 34). As indicated above, the rail insert 160 defines a given number (e.g., seven) of aligned locking channel pairs, thereby providing a lateral adjustment range 170 incorporating a corresponding number of discrete lateral positions for incrementally adjusting the position of the motor slide 120 relative to the rail insert 160. As shown in FIGS. 8-10, the outermost or endmost pairs of aligned locking channels 162 may generally define the outer limits or ends (e.g., at first end position 171 (FIG. 9) and a second end position 172 (FIG. 10)) of the lateral adjustment range 170 while the central pair of aligned locking channels 162 may generally define the center of the lateral adjustment range 170 (e.g., at central position 173 (FIG. 8).

In such an embodiment, it may be desirable to initially assemble the leveling assembly 100 within the bottom rail 34 such that the motor slide 120 is engaged with the rail insert 160 at the central position 173 (e.g., as shown in FIG. 8), with the engagement flanges 136, 137 of the motor slide 120 being received within the central pair of aligned locking channels 162. Thereafter, once the remainder of the covering has been assembled and subsequently installed relative to an architectural structure, the levelness or skew angle of the bottom rail 34 can be assessed. In the event that the bottom rail 34 is skewed in one direction or the other, the positioning of the motor slide 120 relative to the rail insert 160 can be adjusted accordingly to properly level the bottom rail 34. For instance, if the bottom rail 34 is skewed in the counter-clockwise direction (e.g., as described above with reference to FIG. 2), it may be necessary to adjust the lateral position of the motor slide 120 in a first lateral direction (e.g., as indicated by arrow 101 in FIG. 8) from the centralized position 173 towards the first end position 171. Similarly, if the bottom rail 34 is skewed in the clockwise direction (e.g., as described above with reference to FIG. 3), it may be necessary to adjust the lateral position of the motor slide 120 in an opposed second lateral direction (e.g., as indicated by arrow 102 in FIG. 8) from the centralized position 173 towards the second end position 172. Thus, by initially assembling the leveling assembly 100 such that the motor slide 120 is positioned within the center of its lateral adjustment range 170, the levelness of the bottom rail 34 can be adjusted in both clockwise and counter-clockwise directions, as desired.

Figure 11:
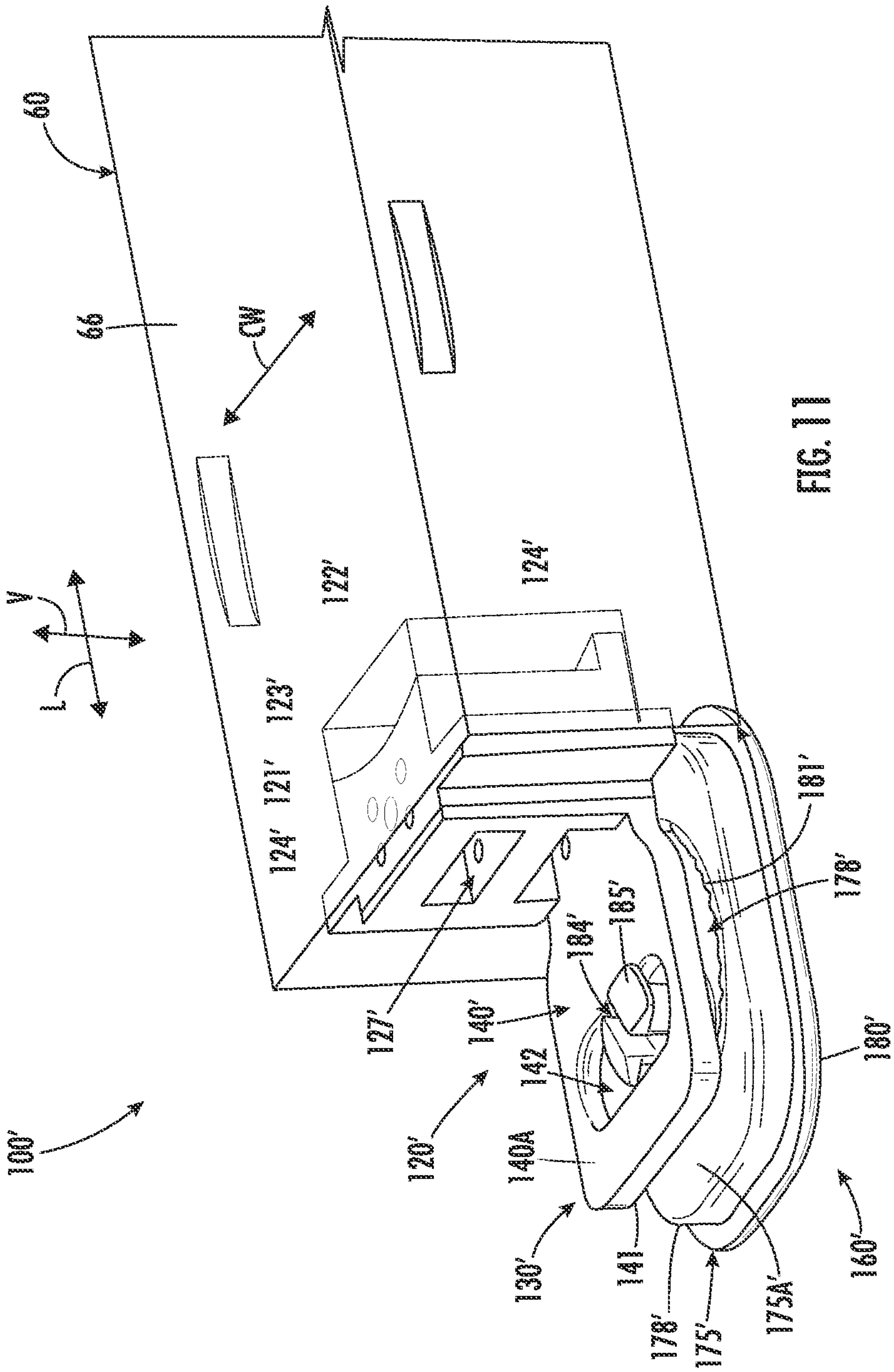
FIG. 11 illustrates a perspective view of another embodiment of a leveling assembly suitable for use within a covering for an architectural structure in accordance with aspects of the present subject matter, particularly illustrating a motor slide and a rail insert of the leveling assembly positioned relative to an associated motor (with only a portion of the motor being illustrated)
Figure 12:
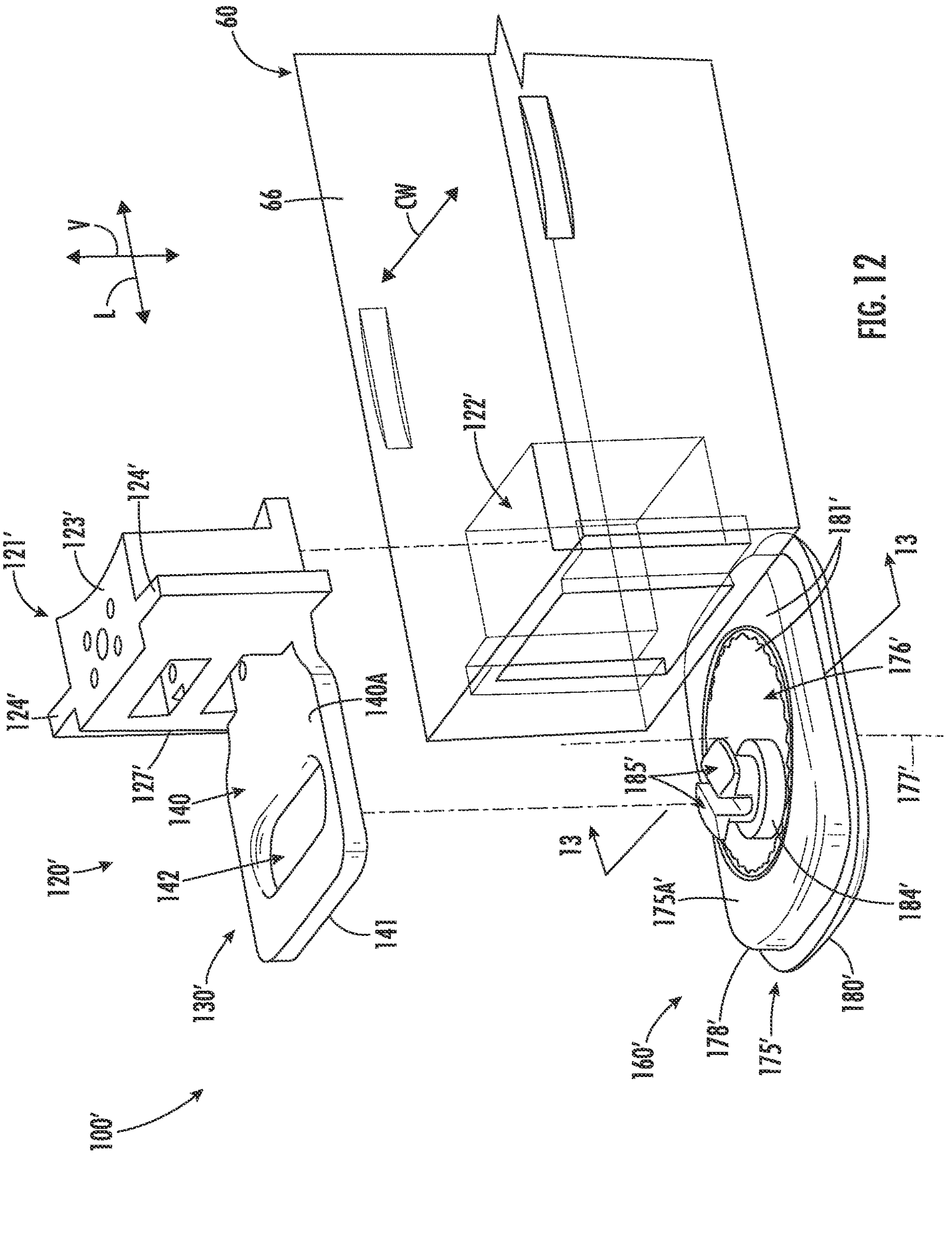
FIG. 12 illustrates another perspective view of the components shown in FIG. 11 with the motor slide of the leveling assembly exploded away from both the rail insert of the leveling assembly and the motor.
Figure 13:
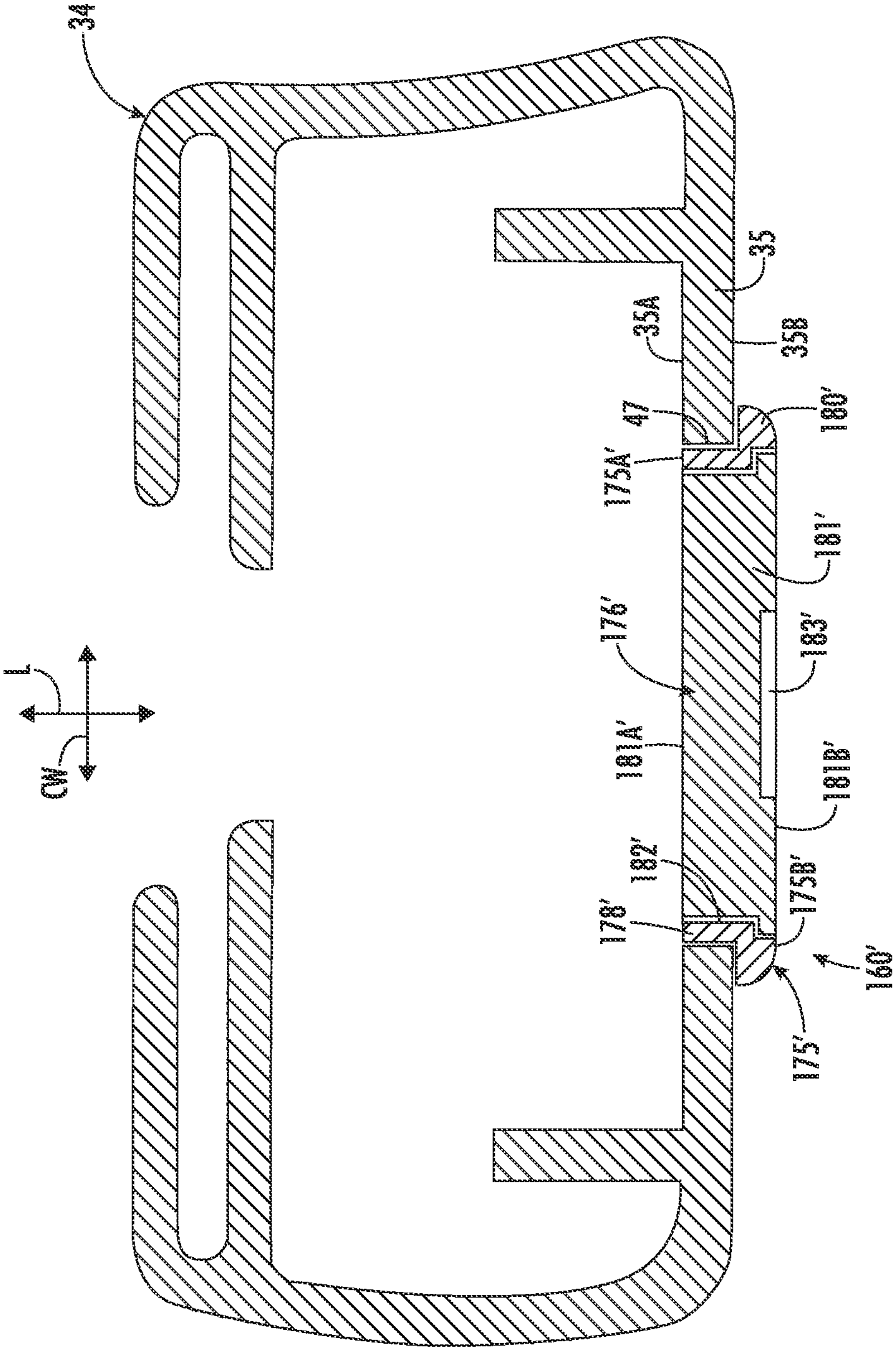
FIG. 13 illustrates a cross-sectional view of the rail insert shown in FIG. 12 as installed within an associated bottom rail and taken from the perspective of line 13-13 shown in FIG. 12.
Figure 14:
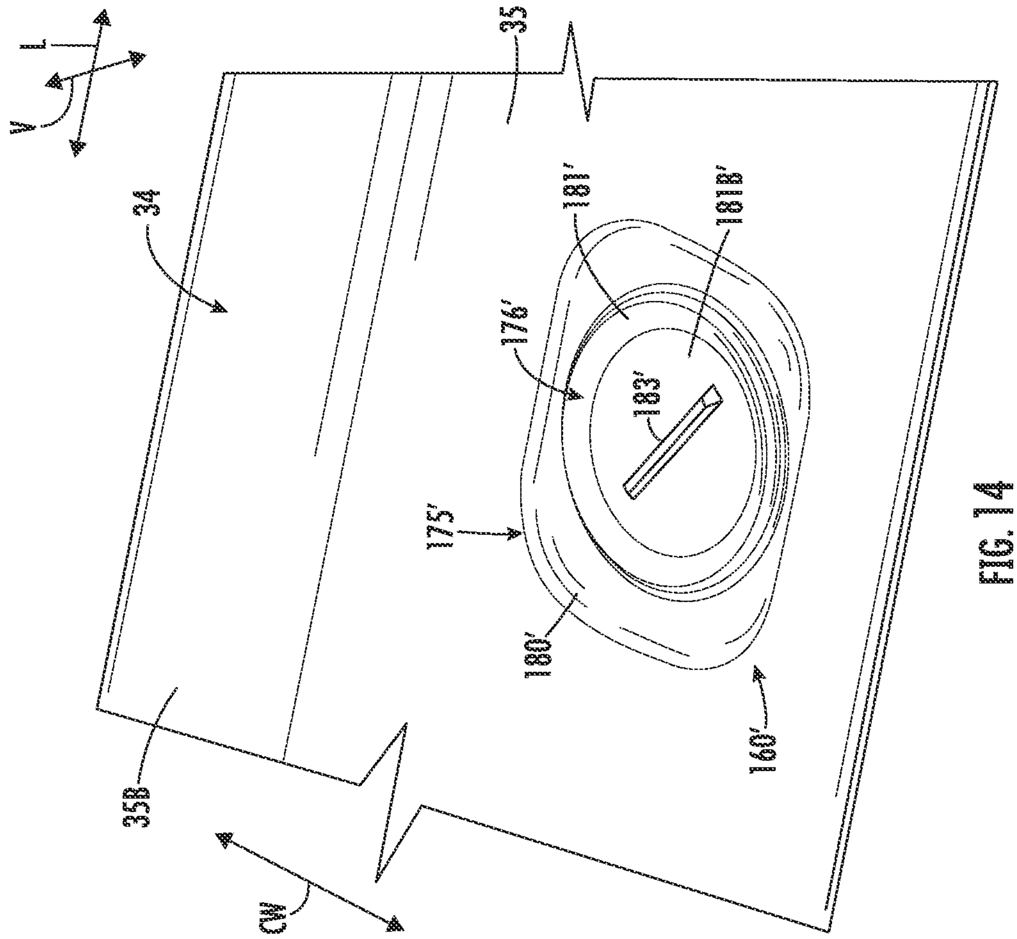
FIG. 14 illustrates a bottom perspective view of the bottom rail shown in FIG. 13, particularly illustrating adjustment features of the leveling assembly positioned relative to a bottom wall of the rail.

Referring now to FIGS. 11-14, another embodiment of a leveling assembly 100' is illustrated in accordance with aspects of the present subject matter. Specifically, FIG. 11 illustrates a perspective view of a first leveling component or slide 120' and a second leveling component or rail insert 160' of the leveling assembly 100' positioned relative to an associated motor (e.g., the motor 60 of the covering 30 shown in FIGS. 1-3), while FIG. 12 illustrates another perspective view of the components shown in FIG. 11 with the slide 120' of the leveling assembly 100' exploded away from both the rail insert 160' of the leveling assembly 100' and the motor 60. FIG. 13 illustrates a cross-sectional view of the rail insert 160' as installed within an associated bottom rail (e.g., the bottom rail 34 of the covering 30 shown in FIGS. 1-3) and taken from the perspective of line 13-13 shown in FIG. 12. Additionally, FIG. 14 illustrates a bottom perspective view of the bottom rail 34 shown in FIG. 13 with the rail insert 160' of the leveling assembly 100' installed therein, particularly illustrating adjustment features of the leveling assembly 100' positioned relative to a bottom wall 35 of the rail 34.

For purposes of discussion, the leveling assembly 100' of FIGS. 11-14 will generally be described with reference to the covering 30 shown in FIGS. 1-3. However, it should be appreciated that the leveling assembly 100' may generally be utilized to adjust the levelness or skew angle of a bottom rail having any other suitable rail configuration and may generally be utilized in association with any other suitable covering having any other suitable covering configuration. It should also be appreciated that, in general, the leveling assembly 100' shown in FIGS. 11-14 and its associated components, features, and/or structures are configured similar to the leveling assembly 100 described above with reference to FIGS. 4-10 and its associated components, features, and/or structures. As such, the components, features, and/or structures of the leveling assembly 100' that are the same or similar to corresponding components, features, and/or structures of the leveling assembly 100 described above will be designated by the same reference character with an apostrophe (') added. Additionally, when a given component, feature, and/or structure of the leveling assembly 100' is configured to generally perform the same function as the corresponding component, feature, and/or structure of the leveling assembly 100 described above, a less detailed description of such component/feature/structure will be provided below for the sake of brevity.

As particularly shown in FIGS. 11 and 12, similar to the leveling assembly 100 described above, the leveling assembly 100' includes both a first leveling component or motor slide 120' configured to be coupled to a portion of the motor 60 such that the motor 60 moves or slides laterally within the interior of the rail 34 upon actuation or movement of the motor slide 120' in the lateral direction L and a second leveling component or rail insert 160' configured to be coupled to a portion of the bottom rail 34 such that the slide 120' is moveable relative to both the rail insert 160' and the bottom rail 34 in the lateral direction L. However, unlike the embodiment described above with reference to FIGS. 4-10 in which the motor slide is configured to be engaged with the rail insert at discrete, laterally spaced locking positions, the rail insert 160' includes a cam-type actuator for adjusting the lateral position of the motor slide 120' relative to the insert 160'. For instance, as will be described below, rotation of the cam-type actuator may result in the motor slide 120' being actuated laterally relative to the rail insert 160' across a range of lateral positions, thereby allowing the motor position within the bottom rail 34 to be correspondingly varied to facilitate adjustments in the levelness or skew angle of the rail 34.

As shown in FIGS. 11 and 12, the motor slide 120' includes both a motor connection portion 121' and a rail connection portion 130'. In general, the motor connection portion 121' of the motor slide 120' is configured the same as or similar to the motor connection portion 121 of the motor slide 120 described above with reference to FIGS. 4 and 5. For instance, as particularly shown in FIG. 12, the motor connection portion 121' includes both a rectangular-shaped insertion block 123' and opposed retention flanges 124' extending outwardly from the insertion block 123' in the crosswise direction CW for receipt in corresponding features of an insertion slot 122' defined in the motor 60, thereby allowing the motor slide 120' to be coupled to the motor 60. Additionally, as shown in FIG. 12, the motor connection portion 121' defines a cord channel 127' for receiving a lift cord therethrough.

Additionally, in several embodiments, the rail connection portion 130' of the motor slide 120' includes an actuation plate 140' extending laterally outwardly from the motor connection portion 121' of the motor slide 120'. For instance, as particularly shown in FIG. 12, the actuation plate 140' generally defines a planar profile extending laterally from the motor connection portion 121' to a distal end 141' of the actuation plate 140'. Moreover, rail connection portion 130' includes an elongated actuation slot 142' is defined through the actuation plate 140'. For instance, as shown in FIG. 12, the actuation slot 142' extends in the crosswise direction CW between opposed ends of the slot 142'. As will be described below, a portion of the cam-type actuator formed by the rail insert 160' may extend through the actuation slot 142' to allow such actuator to engage the motor slide 120'.

As shown in the illustrated embodiment, the rail insert 160' of the leveling assembly 100' is configured as a two-piece construction including both a mounting plate 175' configured to be coupled to the bottom rail 34 and a cam 176' supported by the mounting plate 175' for rotation relative thereto about a rotational axis 177' (FIG. 13). Specifically, as shown in FIGS. 12 and 13, the mounting plate 175' of the rail insert 160' includes a base portion 178' configured to be received within and extend through a correspondingly shaped rail opening 47 defined in the bottom wall 35 of the bottom rail 34 such that an upper surface 175A' of the mounting plate 175' is generally flush with an upper surface 35A (FIG. 13) of the bottom wall 35 of the rail 34. Additionally, the mounting plate 175' includes a retention lip 180' projecting outwardly from the outer perimeter of the base portion 178' of the mounting plate 175' such that, when the mounting plate 175' is installed relative to the bottom rail 34, the retention lip 180' engages the lower surface 35B (FIG. 13) of the bottom wall 35 of the rail 34. For instance, as shown in FIG. 13, the retention lip 180' is configured to engage the lower surface 35B of the bottom wall 35 of the rail 34 around the perimeter the rail opening 47 defined through the bottom wall 35.

Additionally, as shown in FIGS. 12 and 13, the cam 176' of the rail insert 160' includes an annular disc or cam plate 181' configured to be received within a correspondingly shaped, annular cam opening 182' (FIG. 13) defined through the mounting plate 175'. Specifically, in one embodiment, the cam plate 181' may be configured to be received within the cam opening 182' such that an upper side 181A' of the cam plate 181' is generally flush with the upper surfaces 175A'. 35A of the mounting plate 175' and the bottom wall 35 of the rail 34 and a lower side 181B' of the cam plate 181' is generally flush with the lower surface 175B' of the mounting plate 175'. As particularly shown in FIG. 14, by extending through the cam opening 182' defined in the mounting plate 175', the lower side 181B' of the cam plate 181' can be accessed along the exterior of the bottom rail 34, thereby allowing the cam 176' to be rotated relative to both the mounting plate 175' and the bottom rail 34. In the illustrated embodiment, the cam plate 181' includes an engagement feature, such as an engagement slot 183' defined along the lower slide 181B' of the plate 181', configured to allow a suitable tool to be coupled to the cam 176' for rotating the cam 176' relative to the mounting plate 175'. For instance, a correspondingly shaped end of the tool (e.g., a flat head screwdriver) may be inserted within the engagement slot 183' and rotated clockwise or counter-clockwise to cause corresponding rotation of the cam 176'.

Moreover, the cam 176' includes an engagement post 184' extending outwardly from the upper side 181A' of the cam plate 181' into the interior of the bottom rail 34 to allow the post 184' to be received within the adjustment slot 142' of the motor slide 120'. Specifically, as shown in FIG. 11, the engagement post 184' is configured to extend through the adjustment slot 142' such that outwardly projecting retention wings 185' of the post 184' engage an upper surface 140A' of the actuation plate 140' of the motor slide 120', thereby retaining the post 184' within the actuation slot 142'. Such engagement of the retention wings 185' with the upper surface 140A' of the actuation plate 140' may also serve to retain the cam 176' vertically relative to both the motor slide 120' and the mounting plate 175' of the rail insert 160'.

As particularly shown in FIG. 12, the engagement post 184' is radially offset from the rotational axis 177' of the cam 176'. As a result, with the engagement post 184' received within the actuation slot 142' of the motor slide 120' in the manner shown in FIG. 11, rotation of the cam 176' relative to the motor slide 120' about the rotational axis 177' results in lateral movement of the motor slide 120' (and, thus, the motor 60 coupled thereto) relative to the rail insert 160'. Thus, by rotating the cam 176', the lateral position of the motor 60 within the bottom rail 34 can be varied between the opposed lateral ends 44, 46 of the rail 34, as desired, to adjust the levelness or skew angle of the rail 34.

It should be appreciated that, although the rail insert 160' is shown and described herein as a two-piece construction including both a mounting plate 175' and a cam 176', the insert 160' may, instead, be configured to only include the cam 176'. For instance, the features and/or structure of the mounting plate 175' (including, for example, the annular cam opening 182' defined through the mounting plate 175) may be formed or defined by the bottom rail 34. Specifically, in one embodiment, the cam opening 182' may be defined through the bottom wall 35 of the bottom rail 34 to allow the cam 186' to extend through the rail 34 and be retained relative thereto via its engagement with the motor slide 120'.

Figure 15:
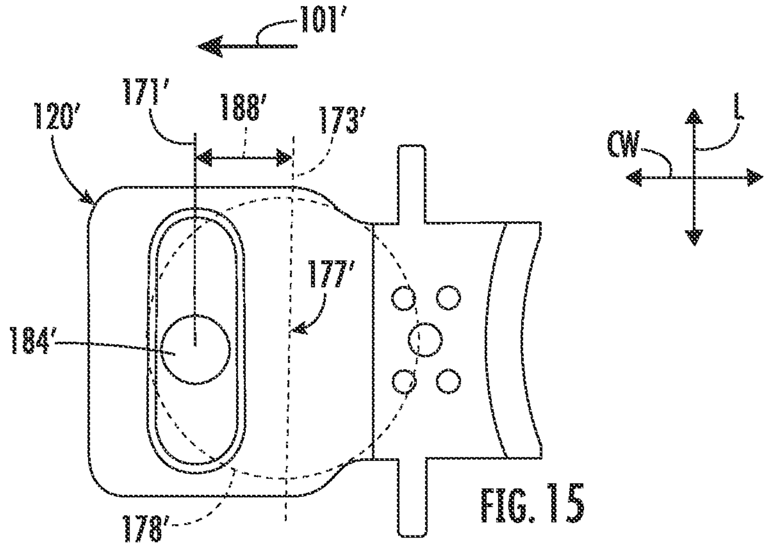
FIG. 15 illustrates a top view of components of the leveling assembly shown in FIG. 11 (with portions of the rail insert shown schematically), particularly illustrating the motor slide disposed at a central position relative to an associated lateral adjustment range for adjusting the position of the motor slide relative to the rail insert.
Figure 16:
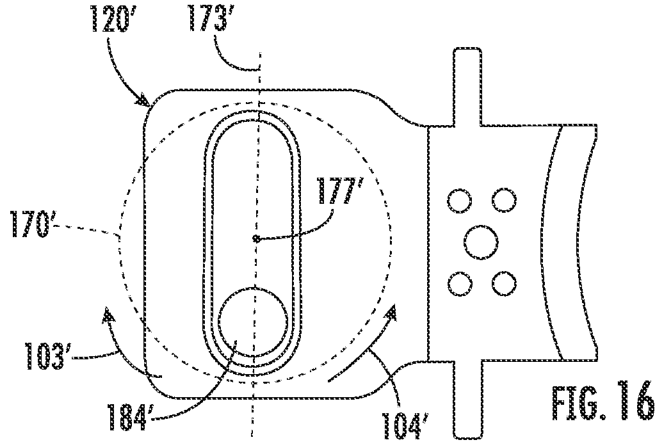
FIG. 16 illustrates another top view of the components shown in FIG. 15, particularly illustrating the motor slide disposed at a first end position relative to the associated lateral adjustment range.
Figure 17:
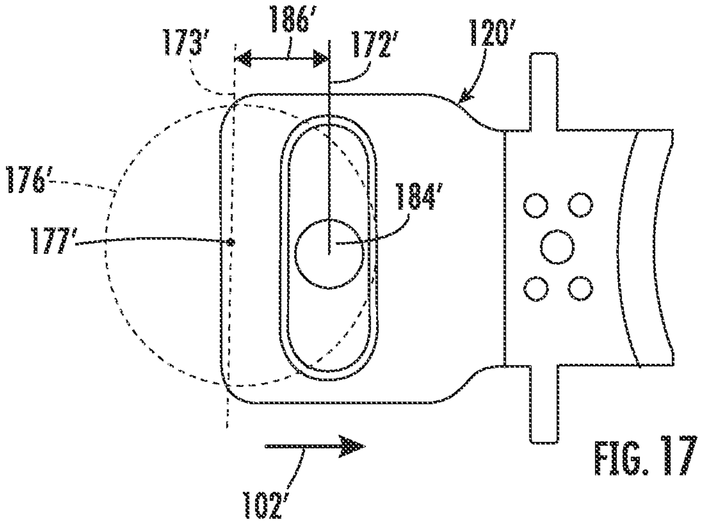
FIG. 17 illustrates a further top view of the components shown in FIG. 15, particularly illustrating the motor slide disposed at a second end position relative to the associated lateral adjustment range.

Referring now to FIGS. 15-17, top views of the motor slide 120' of the leveling assembly 100' described above with reference to FIGS. 11-14 are illustrated as installed relative to the engagement post 184' (indicated schematically by the solid circle) and the associated cam 176' (indicated schematically by the dashed circle) of the rail insert 160', particularly illustrating an example lateral adjustment range for adjusting the position of the motor slide 120' relative to the rail insert 160' (and, thus, the position of the motor 60 relative to the bottom rail 34). Specifically, FIGS. 15 and 17 illustrate the motor slide 120' at the outer limits or ends (e.g., a first end position 171' (FIG. 15) and a second end position 172' (FIG. 16)) of its associational lateral adjustment range, while FIG. 16 illustrates the motor slide 120' disposed at the center of the lateral adjustment range (e.g., as indicated by centerline 173). As shown in FIG. 15, with the cam 176' rotated to the illustrated circumferential position such that the engagement post 184' is located at the nine o'clock position (which may, for example, correspond to the position at which the engagement post 184' is closest to the first lateral end 44 (FIG. 1) of the bottom rail 34), the motor slide 120' is disposed at a maximum lateral distance 186' from its center position 173' in a first lateral direction (indicated by arrow 101' in FIG. 15). Similarly, as shown in FIG. 17, with the cam 176' rotated to the illustrated circumferential position such that the engagement post 184' is located at the three o'clock position (which may, for example, correspond to the position at which the engagement post 184' is closest to the second lateral end 46 of the bottom rail 34), the motor slide 120' is disposed at the maximum lateral distance 186' from its center position 173' in an opposed, second lateral direction (indicated by arrow 102' in FIG. 17). Thus, from either end position 171', 172', the cam 176' may simply be rotated about its rotational axis 177' ninety degrees relative to the motor slide 120' in either direction (e.g., clockwise or counter-clockwise) to actuate the motor slide 120' to its central position 173' so that the engagement post 184' is positioned, for example, at the six or twelve o'clock position (which may, for example, correspond to the position at which the engagement post 184' is centrally disposed between the first and second lateral ends 44, 46 (FIG. 1) of the bottom rail 34).

Similar to the embodiment of the leveling assembly 100 described above, it may be desirable to initially assemble the leveling assembly 100' within the bottom rail 34 such that the motor slide 120' is disposed at the central position 173' (e.g., as shown in FIG. 16). Thereafter, once the remainder of the covering has been assembled and subsequently installed relative to an architectural structure, the levelness or skew angle of the bottom rail 34 can be assessed. In the event that the bottom rail 34 is skewed in one direction or the other, the positioning of the motor slide 120' relative to the rail insert 160' can be adjusted to properly level the bottom rail 34. For instance, if the bottom rail 34 is skewed in the counter-clockwise direction (e.g., as described above with reference to FIG. 2), it may be necessary to rotate the cam 176' relative to the motor slide 120' in a first rotational direction (e.g., as indicated by arrow 103' in FIG. 16) to adjust the lateral position of the motor slide 120' in the first lateral direction 101' from the centralized position 173' towards the first end position 171'. Similarly, if the bottom rail 34 is skewed in the clockwise direction (e.g., as described above with reference to FIG. 3), it may be necessary to rotate the cam 176' relative to the motor slide 120' in an opposed, second rotational direction (e.g., as indicated by arrow 104' in FIG. 16) to adjust the lateral position of the motor slide 120' in the second lateral direction 102' from the centralized position 173' towards the second end position 172'.

Figure 18:
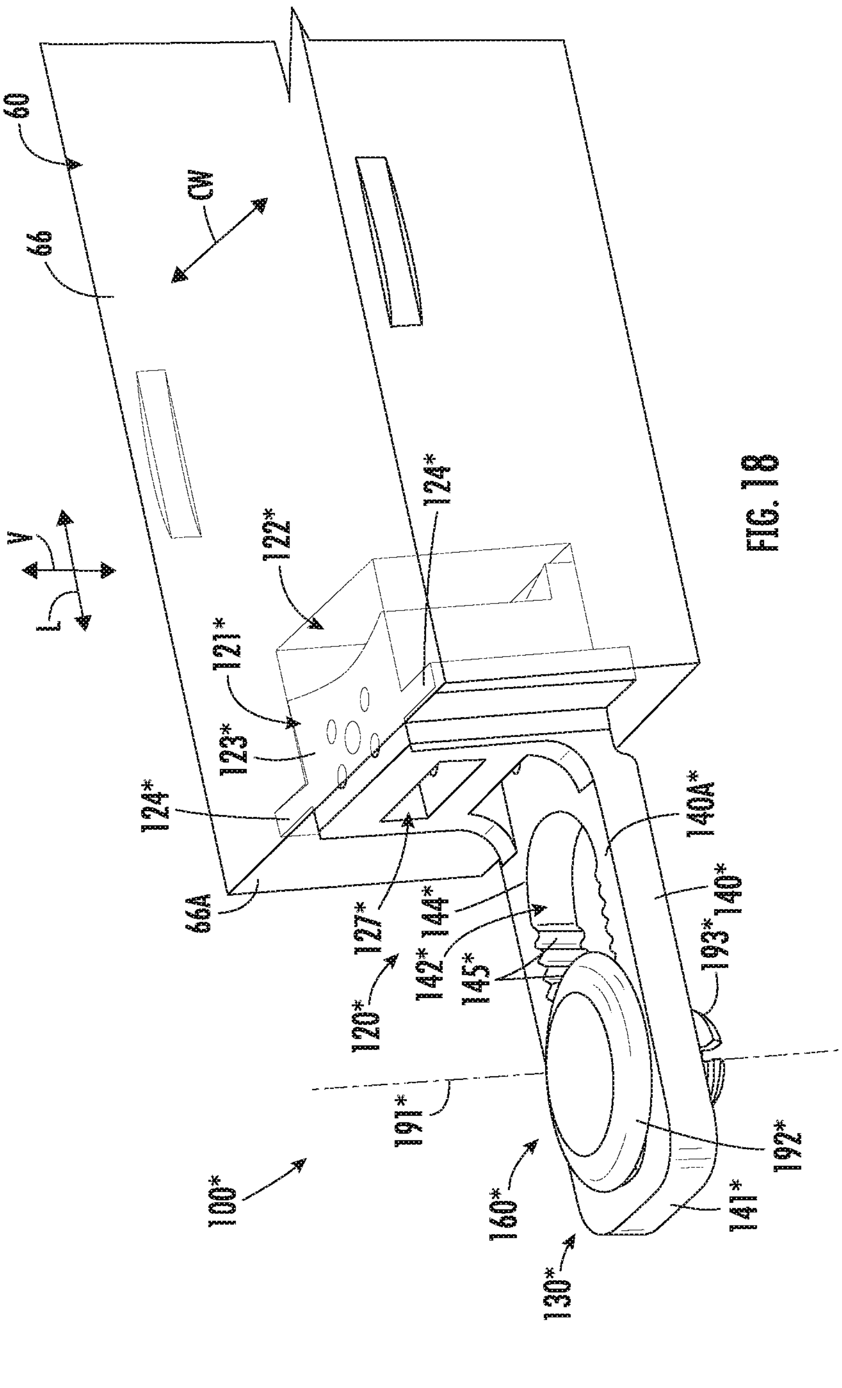
FIG. 18 illustrates a perspective view of a further embodiment of a leveling assembly suitable for use within a covering for an architectural structure in accordance with aspects of the present subject matter, particularly illustrating a motor slide and a rail insert of the leveling assembly positioned relative to an associated motor (with only a portion of the motor being illustrated)
Figure 19:
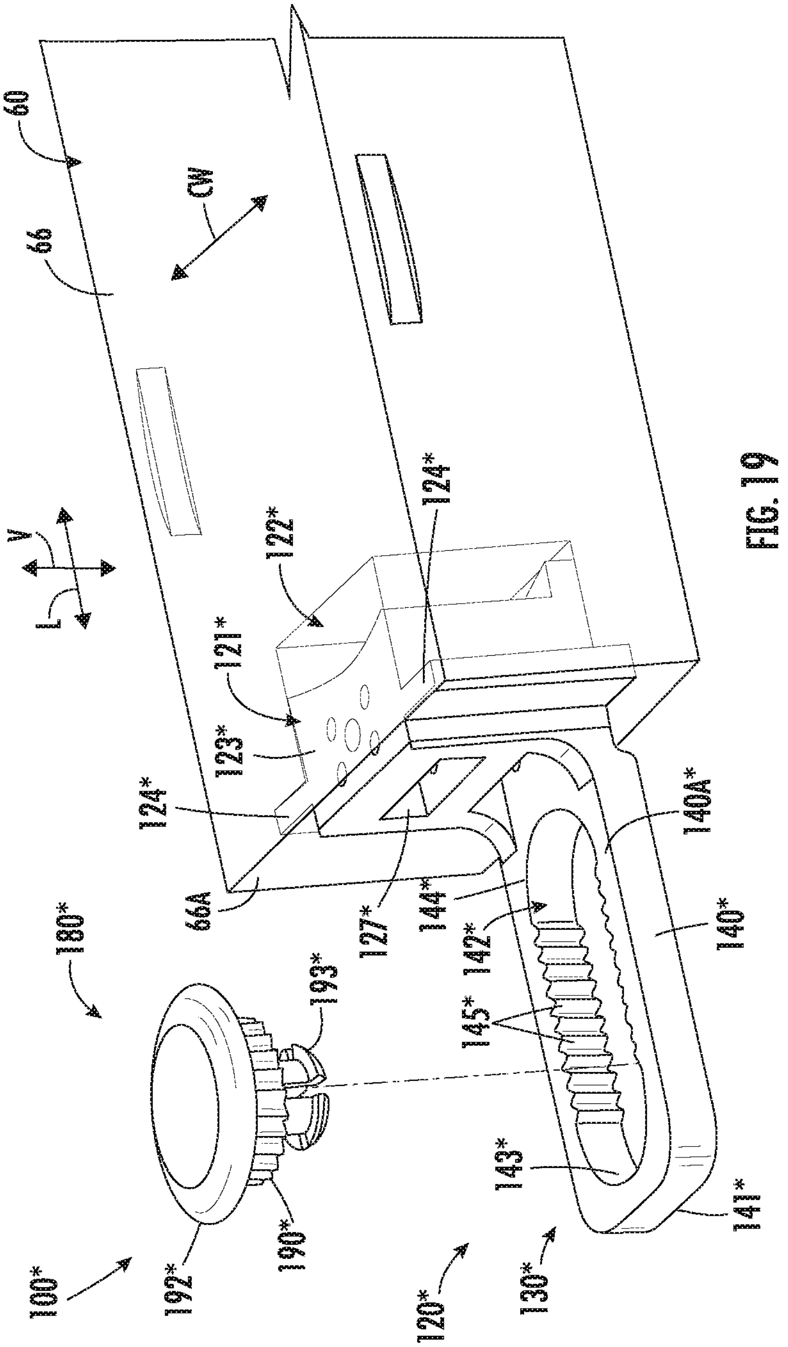
FIG. 19 illustrates another perspective view of the components shown in FIG. 18 with the rail insert of the leveling assembly exploded away from both the motor slide of the leveling assembly and the motor.
Figure 20:
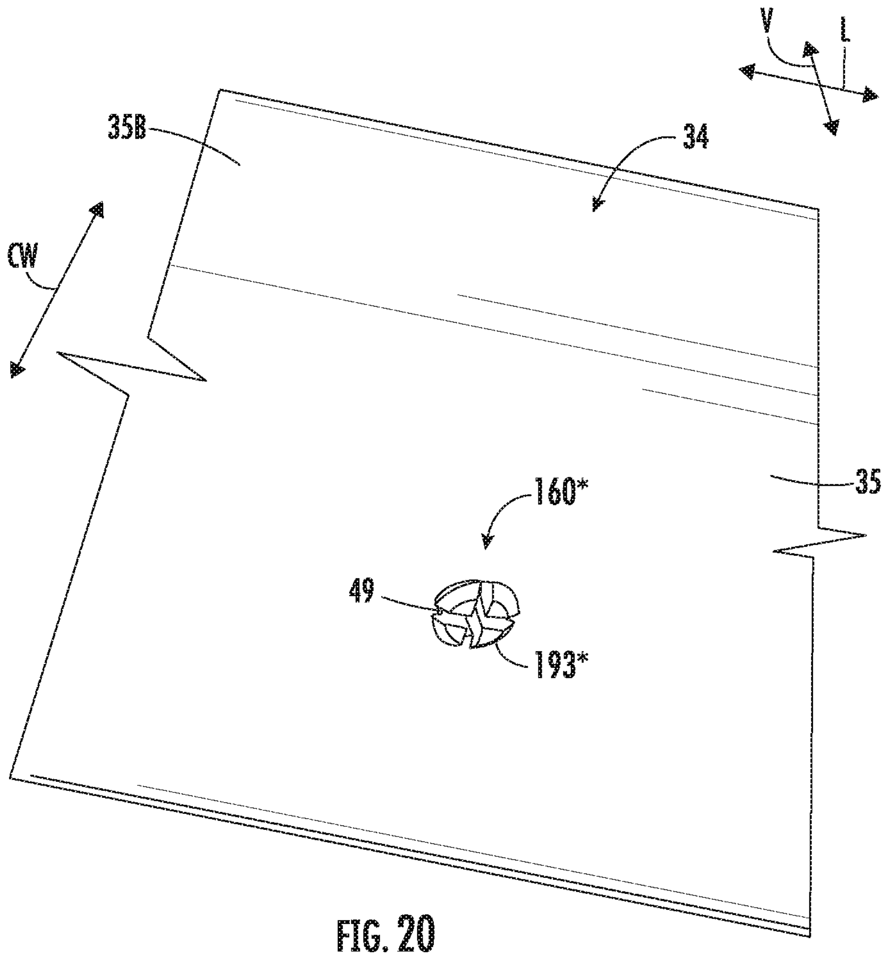
FIG. 20 illustrates a bottom perspective view of an associated bottom rail with the rail insert of the leveling assembly shown in FIGS. 18 and 19 installed therein, particularly illustrating adjustment features of the leveling assembly positioned relative to a bottom wall of the rail.

Referring now to FIGS. 18-20, yet another embodiment of a leveling assembly 100* is illustrated in accordance with aspects of the present subject matter. Specifically, FIG. 18 illustrates a perspective view of a motor slide 120* and a rail insert 160* of the leveling assembly 100* positioned relative to an associated motor (e.g., the motor 60 of the covering 30 shown in FIGS. 1-3), while FIG. 19 illustrates another perspective view of the components shown in FIG. 18 with the rail insert 160* of the leveling assembly 100* exploded away from both the motor slide 120* of the leveling assembly 100* and the motor 60. Additionally, FIG. 20 illustrates a bottom perspective view of the bottom rail 34 with the rail insert 160* of the leveling assembly 100* installed therein, particularly illustrating adjustment features of the leveling assembly 100* positioned relative to a bottom wall 35 of the rail 34.

For purposes of discussion, the leveling assembly 100* of FIGS. 11-14 will generally be described with reference to the covering 30 shown in FIGS. 1-3. However, it should be appreciated that the leveling assembly 100* may generally be utilized to adjust the levelness or skew angle of a bottom rail having any other suitable rail configuration and may generally be utilized in association with any other suitable covering having any other suitable covering configuration. It should also be appreciated that, in general, the leveling assembly 100* shown in FIGS. 18-20 and its associated components, features, and/or structures are configured similar to the leveling assemblies 100, 100' described above with reference to FIGS. 4-17 and their associated components, features, and/or structures. As such, the components, features, and/or structures of the leveling assembly 100* that are the same or similar to corresponding components, features, and/or structures of the leveling assemblies 100, 100' described above will be designated by the same reference character with an asterisk (*) added. Additionally, when a given component, feature, and/or structure of the leveling assembly 100* is configured to generally perform the same function as the corresponding component, feature, and/or structure of one of the leveling assemblies 100, 100' described above, a less detailed description of such component/feature/structure will be provided below for the sake of brevity.

As particularly shown in FIGS. 18 and 19, similar to the leveling assemblies 100, 100' described above, the leveling assembly 100* includes both a first leveling component or motor slide 120* configured to be coupled to a portion of the motor 60 such that the motor 60 moves or slides laterally within the interior of the rail 34 upon actuation or movement of the motor slide 120* in the lateral direction L and a second leveling component or rail insert 160* configured to be coupled to a portion of the bottom rail 34 such that the rail insert 160* is fixed or non-movable relative to the bottom rail 34 in the lateral direction L. However, unlike the embodiment described above with reference to FIGS. 11-17 in which the rail insert includes a cam-type actuator for adjusting the lateral position of the motor slide relative to the insert, the leveling assembly 100* utilizes a rack-and-pinion-type actuation mechanism to adjust the lateral position of the motor slide 120*. For instance, as will be described below, rotation of the rail insert 160* may result in the motor slide 120* being actuated laterally relative to the rail insert 160* across a range of lateral positions, thereby allowing the motor position within the bottom rail 34 to be correspondingly varied to facilitate adjustments in the levelness or skew angle of the rail 34.

As shown in FIGS. 18 and 19, the motor slide 120* includes both a motor connection portion 121* and a rail connection portion 130*. In general, the motor connection portion 121* of the motor slide 120*is configured the same as or similar to the motor connection portions 121, 121' of the motor slides 120, 120' described above. For instance, as shown in FIGS. 18 and 19, the motor connection portion 121* includes both a rectangular-shaped insertion block 123* and opposed retention flanges 124* extending outwardly from the insertion block 123* in the crosswise direction CW for receipt in corresponding features of an insertion slot 122* defined in the motor 60, thereby allowing the motor slide 120* to be coupled to the motor 60. Additionally, as shown in FIG. 19, the motor connection portion 121* defines a cord channel 127* for receiving a lift cord therethrough.

Additionally, in several embodiments, the rail connection portion 130* of the motor slide 120* includes an actuation plate 140* extending laterally outwardly from the motor connection portion 121* of the motor slide 120*. For instance, as particularly shown in FIG. 19, the actuation plate 140* generally defines a planar profile extending laterally from the motor connection portion 121* to a distal end 141* of the actuation plate 140*. Moreover, rail connection portion 130* includes an elongated actuation slot 142* defined through the actuation plate 140*. For instance, as shown in FIG. 19, the actuation slot 142* extends in the lateral direction L from a first slot end 143* and a second slot end 144*.

As indicated above, the leveling assembly 100 may incorporate a rack-and-pinion type actuation mechanism for adjusting the lateral position of the motor slide 120* relative to the rail insert 160*. In this regard, the rail connection portion 130* of the motor slide 120* may, in several embodiments, be configured to form a rack gear for engaging a corresponding feature of the rail insert 160*. For example, as particularly shown in FIG. 19, the actuation plate 140* of the motor slide 120* includes gear teeth 145* projecting into the actuation slot 142" for engaging a corresponding pinion gear or drive gear 190* of the rail insert 160*. In such an embodiment, rotation of the rail insert 160* relative to motor slide 120* about its axis of rotation 191* (FIG. 18) results in actuation of the motor slide 120* in the lateral direction L via the meshing engagement between the drive gear 190* and the gear teeth 145* of the motor slide 120*.

As shown in FIGS. 18-20, in addition to the drive gear 190*, the rail insert 160* of the leveling assembly 100* further includes an annular retention lip 192* positioned along one axial side of the drive gear 190* for engaging an upper surface 140A* of the actuation plate 140* of the motor slide 120*, thereby vertically retaining the rail insert 160* relative to the motor slide 120*. Additionally, the rail insert 160* includes an adjustment post 193* extending axially from the opposed side of the drive gear 190*. As particularly shown in FIG. 20, the adjustment post 193* is configured to be received within and extend through a correspondingly shaped rail opening 49 defined in the bottom wall 35 of the bottom rail 34. As a result, the adjustment post 193* is accessible along the exterior of the bottom rail 34, thereby allowing the rail insert 160* to be rotated relative to motor slide 120* to adjust the relative positioning of the motor slide 120* within the rail 34. For instance, a suitable tool may be coupled to or engaged with the adjustment post 193* (e.g., a Philips head screwdriver) for rotating the rail insert 160* relative to the motor slide 120*.

Figure 21:
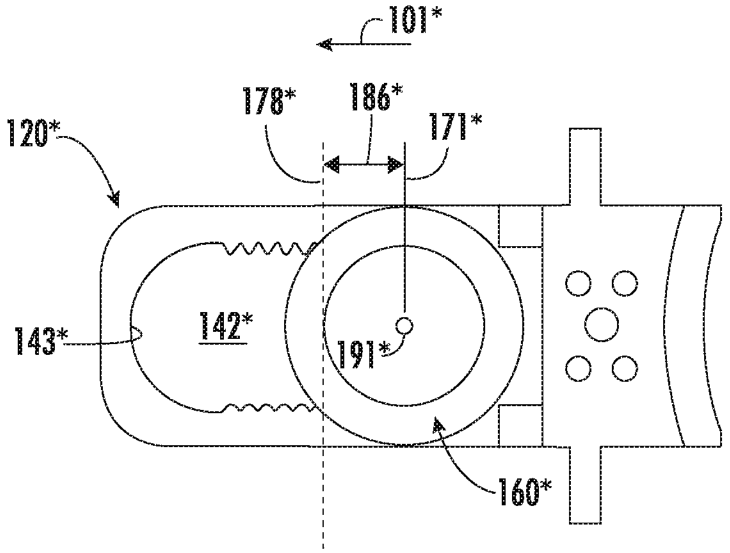
FIG. 21 illustrates a top view of the leveling assembly shown in FIG. 18, particularly illustrating the motor slide disposed at a central position relative to an associated lateral adjustment range for adjusting the position of the motor slide relative to the rail insert.
Figure 22:
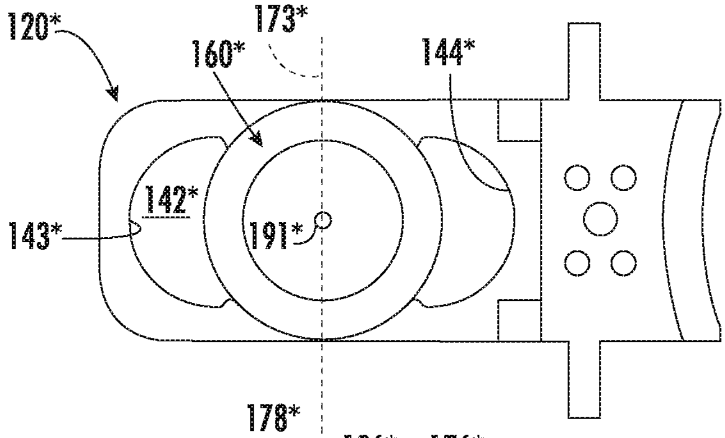
FIG. 22 illustrates another top view of the components shown in FIG. 18, particularly illustrating the motor slide disposed at a first end position relative to the associated lateral adjustment range.
Figure 23:
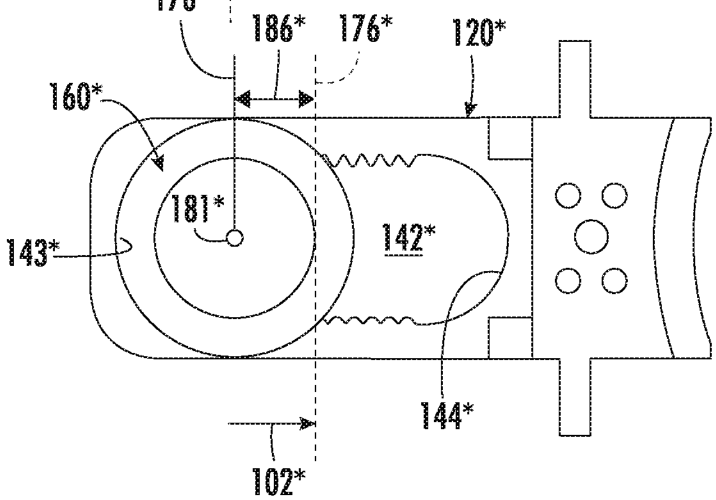
FIG. 23 illustrates a further top view of the components shown in FIG. 18, particularly illustrating the motor slide disposed at a second end position relative to the associated lateral adjustment range.

Referring now to FIGS. 21-23, top views of the leveling assembly 100* described above with reference to FIGS. 18-20 are illustrated in accordance with aspects of the present subject matter, particularly illustrating an example lateral adjustment range for adjusting the position of the motor slide 120* relative to the rail insert 160* (and, thus, the position of the motor 60 relative to the bottom rail 34). Specifically, FIGS. 21 and 23 illustrate the motor slide 120* at the outer limits or ends (e.g., a first end position 171* (FIG. 21) and a second end position 172* (FIG. 23)) of its associational lateral adjustment range as referenced relative to the center of the actuation slot 142* (e.g., as indicated by dashed line 146*), while FIG. 22 illustrates the motor slide 120* disposed at the center of the lateral adjustment range (e.g., at center position 173*). As shown in FIG. 21, when the rail insert 160* is rotated relative to the motor slide 120* such that the rail insert 160* is disposed at the second end 144* of the actuation slot 142*, the center of the actuation slot 142* is disposed at a maximum lateral distance 186* from the rotational axis 191* of the rail insert 160* in a first lateral direction (indicated by arrow 101* in FIG. 21). Similarly, as shown in FIG. 23, when the rail insert 160* is rotated relative to the motor slide 120* such that the rail insert 160* is disposed at the first end 143* of the actuation slot 142*, the center 146* of the actuation slot 142* is disposed at the maximum lateral distance 186* from the rotational axis 191* of the rail insert 160* in an opposed, second lateral direction (indicated by arrow 102* in FIG. 23). Thus, from either end position 171*, 172*, the rail insert 160* may be rotated about its rotational axis 191* relative to the motor slide 120* to actuate the motor slide 120* to its central position 173* so that the center 146* of the actuation slot 142* is aligned with the rotational axis 191* of the rail insert 160* (e.g., as shown in FIG. 22).

Similar to the embodiments of the leveling assemblies 100, 100' described above, it may be desirable to initially assemble the leveling assembly 100* within the bottom rail 34 such that the motor slide 120* is disposed at the central position 173* (e.g., as shown in FIG. 22). Thereafter, once the remainder of the covering has been assembled and subsequently installed relative to an architectural structure, the levelness or skew angle of the bottom rail 34 can be assessed. In the event that the bottom rail 34 is skewed in one direction or the other, the positioning of the motor slide 120* relative to the rail insert 160* can be adjusted to properly level the bottom rail 34. For instance, if the bottom rail 34 is skewed in the counter-clockwise direction (e.g., as described above with reference to FIG. 2), it may be necessary to rotate the rail insert 160* relative to the motor slide 120* in a first rotational direction to adjust the lateral position of the motor slide 120* in the first lateral direction 101* from the centralized position 173* towards the first end position 171*. Similarly, if the bottom rail 34 is skewed in the clockwise direction (e.g., as described above with reference to FIG. 3), it may be necessary to rotate the rail insert 160* relative to the motor slide 120* in an opposed, second rotational direction to adjust the lateral position of the motor slide 120* in the second lateral direction 102* from the centralized position 173* towards the second end position 172*.

Figure 24:
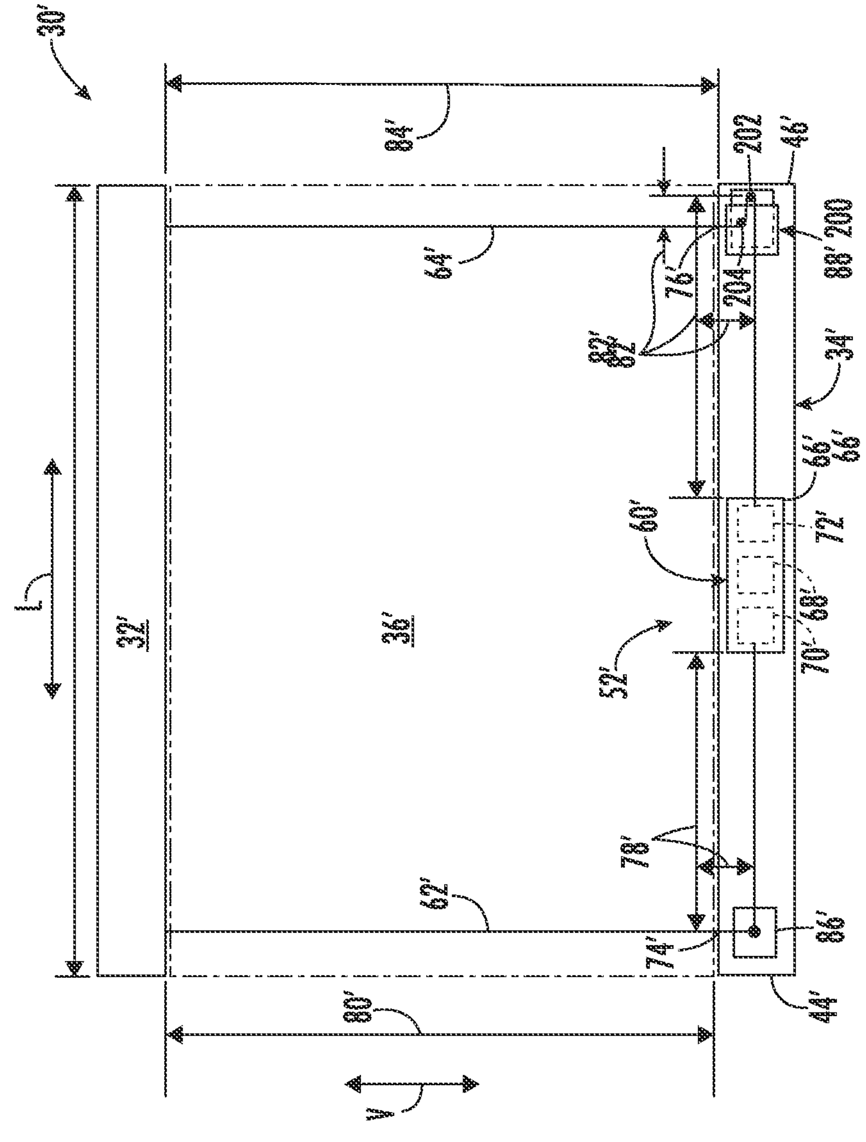
FIG. 24 illustrates a schematic, front view of another embodiment of a covering for an architectural structure in accordance with aspects of the present subject matter, particularly illustrating a leveling assembly provided in operative association with a bottom rail of the covering.

Referring now to FIG. 24, a schematic view of another embodiment of a covering 30' for an architectural structure is illustrated in accordance with aspects of the present subject matter. In general, the covering 30' is configured the same as or similar to the covering 30 described above with reference to FIGS. 1-3. For instance, as shown in FIG. 24, the covering 30' is configured as a horizontal-type extendable/retractable covering including a headrail 32', a bottom rail 34', and at least one covering element 36' supported between the headrail 32' and the bottom rail 34', with the bottom rail 34' extending in the lateral direction L between a first lateral end 44' of the bottom rail 34' and a second lateral end 46' of the bottom rail 34'. Additionally, the covering 30' includes a lift system 52' for moving the covering 30' in the vertical direction V between an extended position (e.g., as shown in FIG. 34) and a retracted position. As shown in the illustrated embodiment, the lift system 52' includes a motor 60' positioned within the bottom rail 34' (incorporating, for example, an outer housing 66' and a motor spring element 68' and lift spools 70', 72' positioned within the housing 66') and a pair of lift cords (e.g., a first lift cord 62' and a second lift cord 64') coupled to the motor 60' and extending between the headrail 32' and the bottom rail 34' to allow the bottom rail 34' to be raised and lowered relative to the headrail 32' to move the covering 30' between the retracted and extended positions, respectively.

Similar to the embodiment of the covering 30 described above with reference to FIGS. 1-3, each lift cord 62', 64' defines both a cord travel length along which the lift cord 62', 64' extends within the bottom rail 34' between the motor 60' and its respective exit point 74', 76' along the bottom rail 34' and a vertical or effective cord length along which the lift cord 62', 64' extends between the bottom rail 34' and the headrail 32'. Specifically, as shown in FIG. 24, the first lift cord 62' extends laterally/vertically within the bottom rail 34' from the motor 60' to a first cord exit location 74' defined adjacent to the first lateral end 44' of the bottom rail 34' such that the first lift cord 62' defines a first cord travel length 78' corresponding to the total length of the first lift cord 62' extending within the bottom rail 34' between the motor 60' and the first cord exit location 74' (e.g., a summation of the lateral and vertical cords lengths within the bottom rail 34'). The first lift cord 62' then extends vertically from the bottom rail 34' to the headrail 32' such that the lift cord 62' defines a first effective cord length 80' between the headrail 32' and bottom rail 34'. As such, the summation of the first cord travel length 78' and the first effective cord length 80' generally corresponds to the overall length of the first lift cord 62' defined between the motor 60' and the headrail 32'. Similarly, as shown in FIG. 24, the second lift cord 64' extends laterally/vertically within the bottom rail 34' from the motor 60' to a second cord exit location 76' defined adjacent to the second lateral end 46' of the bottom rail 34' such that the second lift cord 64' defines a second cord travel length 82' corresponding to the total length of the second lift cord 64' extending within the bottom rail 34' between the motor 60' and the second cord exit location 76' (e.g., a summation of the lateral and vertical cords lengths within the bottom rail 34'). The second lift cord 64' then extends vertically from the bottom rail 34' to the headrail 32' such that the lift cord 64' defines a second effective cord length 84' between the headrail 32' and bottom rail 34'. As such, the summation of the second cord travel length 82' and the second effective cord length 84' generally corresponds to the overall length of the second lift cord 64' defined between the motor 60' and the headrail 32'.

Additionally, the lift system 50' includes turn-up or cord cradles 86', 88' provided within the bottom rail 34' to assist in guiding each lift cord 62', 64' relative to its corresponding exit location 74', 76'. Each cord cradle 86', 88' may, for example, include one or more components (e.g., a guide pin(s) and/or roller(s)) positioned at the location at which the associated lift cord 62', 64' switches travel directions along the travel path towards the respective exit location 74', 76', thereby reducing the amount of friction and noise associated with operation of the covering 30' as the lift cords 62', 64' passes by such locations during extension and retraction of the covering 30'. However, unlike the embodiment of the covering 30 described above with reference to FIGS. 1-3, one or both of the cord cradles 86', 88' may also be configured to function as a leveling assembly for the covering 30'. Specifically, in the illustrated embodiment, the first cord cradle 86' is generally configured as a conventional turn-up or cord cradle, while the second cord cradle 88' is configured as a leveling assembly 200 (the second cord cradle 88' being generally referred to hereinafter as the "leveling assembly 200"). However, in other embodiments, the first cord cradle 86' may, instead, by configured as a leveling assembly or both of the cord cradles 86', 88' may be configured as leveling assemblies.

As will be described in greater detail below with reference to FIGS. 25-29, the leveling assembly 200 may be configured as an expandable turn-up cradle that allows the cord length of the second lift cord 64' to be varied, thereby permitting the levelness or skew angle of the bottom rail 34' to be adjusted. Specifically, the leveling assembly 200 may be configured such that the second lift cord 64' enters the leveling assembly 200 from the motor 60', wraps around a first cord post 202 of the leveling assembly 200, and extends laterally within the leveling assembly 200 back towards the motor 60' before wrapping around a second cord post 204 of the leveling assembly 200 and exiting the bottom rail 34' vertically at the second cord exit location 76'. Such a serpentine-like travel path for the second lift cord 64' within the leveling assembly 200 allows for the cord travel length 82' of the second lift cord 64' to be varied by adjusting the lateral distance between the first and second cord posts 202, 204, which, in turn, results in a corresponding adjustment in the effective cord length 84' of the second lift cord 64'. For instance, by increasing the lateral distance defined between the first and second cord posts 202, 204, the cord travel length 82' of the second lift cord 64' within the bottom rail 34' will be increased, thereby reducing the effective cord length 84' of the second lift cord 64' and, thus, raising the second lateral end 46' of the bottom rail 34' relative to the headrail 32'. Similarly, by reducing the lateral distance defined between the first and second cord posts 202, 204, the cord travel length 82' of the second lift cord 64' will be decreased, thereby increasing the effective cord length 84' of the second lift cord 64' and, thus, lowering the second lateral end 46' of the bottom rail 34' relative to the headrail 32'. Accordingly, by varying the cord length of the second lift cord 64' via the leveling assembly 200, the levelness of the bottom rail 34' can be adjusted.

It should be appreciated that, although the lift system components and leveling assembly 200 of the covering 30' of the illustrated embodiment shown in FIG. 24 are positioned within or otherwise provided in operative association with the bottom rail 34', such components may, instead, be positioned within or otherwise provided in operative association with the headrail 32'. For instance, in one embodiment, the motor 60', the first cord cradle 86', and the leveling assembly 200 may be positioned within the headrail 32', with the lift cords 62', 64' extending from the motor 60' within the headrail 32' to the cord cradles 86' and leveling assembly 200 before turning down and extending towards the bottom rail 34'. In such an embodiment, the leveling assembly 200 may similarly be used to adjust the lateral distance defined between the cord posts 202, 204 within the headrail 32', thereby varying the effective cord lengths 80', 84' of the lift cords 62', 64' to allow the levelness or skew angle of the bottom rail 34' to be adjusted. Thus, it should be appreciated that the various embodiments of the leveling assembly 200 described herein, such as the embodiments described below with reference to FIGS. 25-29, are equally applicable to use of the leveling assembly 120 within the headrail 32' and the description of such embodiments should not be interpreted as being limited to use of the leveling assembly 200 in association with the bottom rail 34'.

Figure 25:
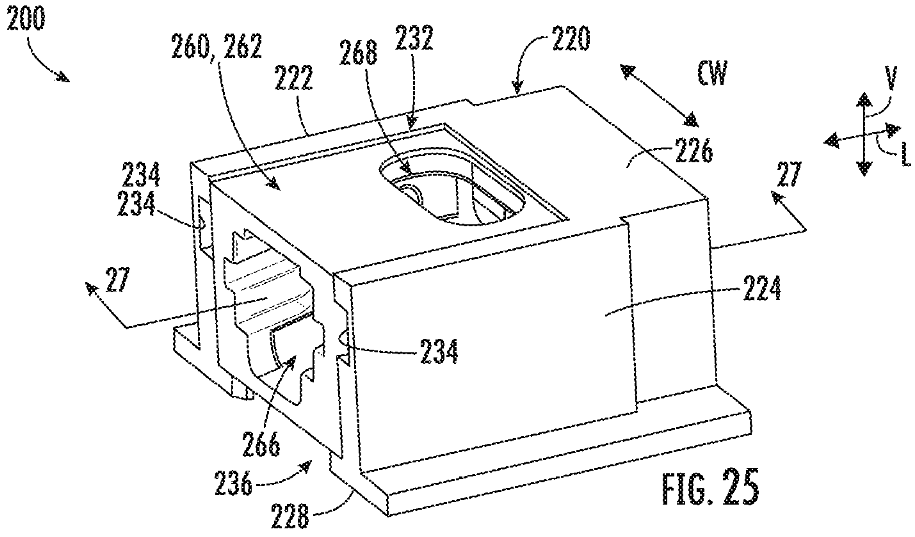
FIG. 25 illustrates a top, perspective view of yet another embodiment of a leveling assembly suitable for use within a covering for an architectural structure in accordance with aspects of the present subject matter, particularly illustrating the leveling assembly in a fully retracted state.
Figure 26:
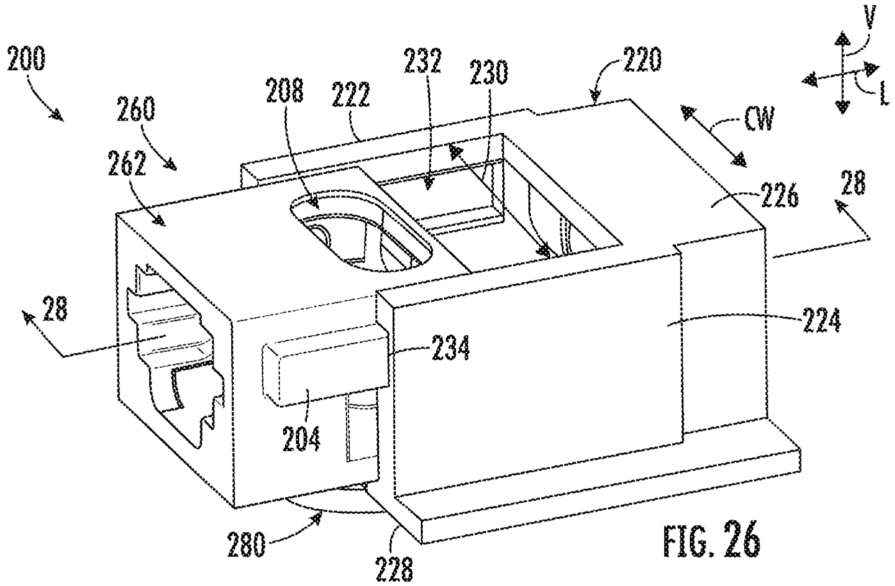
FIG. 26 illustrates another top, perspective view of the leveling assembly shown in FIG. 26, particularly illustrating the leveling assembly in a fully expanded state.
Figure 27:
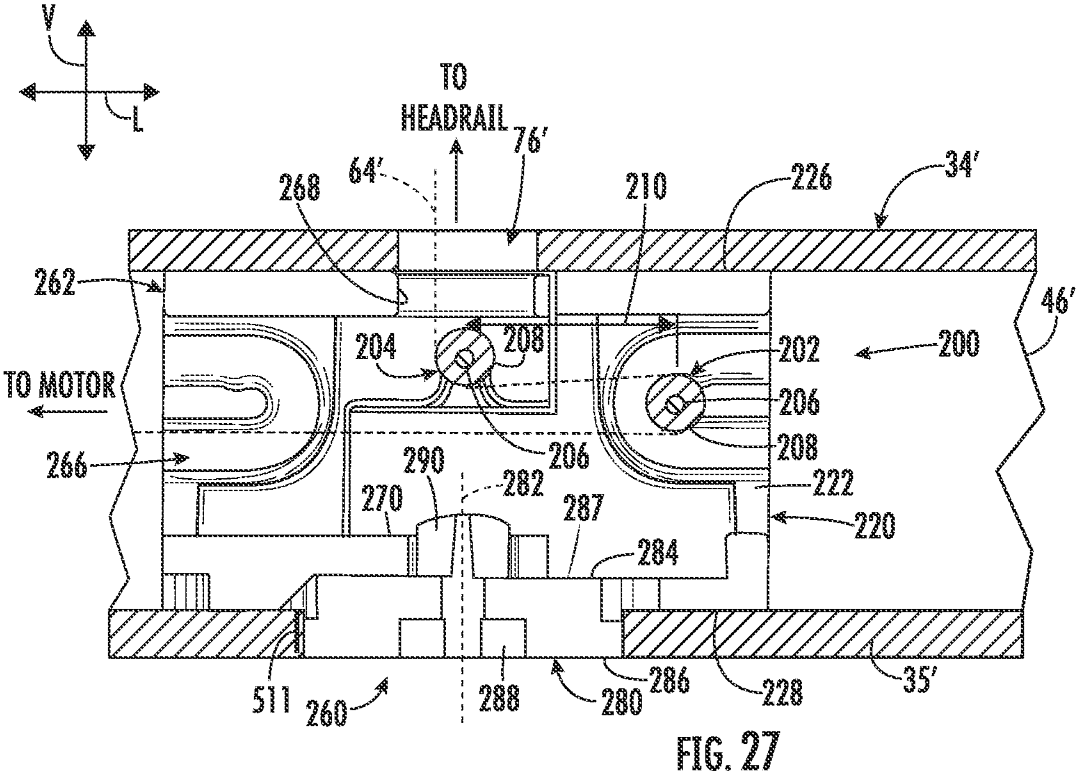
FIG. 27 illustrates a cross-sectional view of the leveling assembly shown in FIG. 25 taken about line 27-27.
Figure 28:
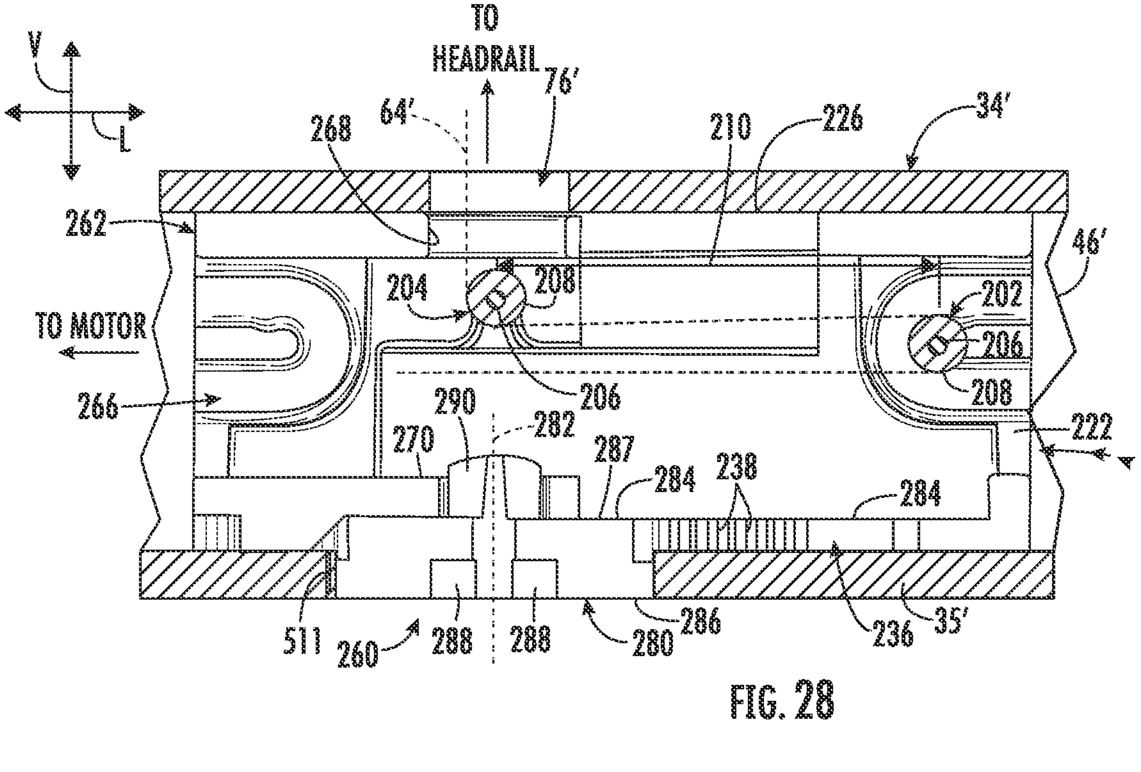
FIG. 28 illustrates a cross-sectional view of the leveling assembly shown in FIG. 26 taken about line 28-28.
Figure 29:
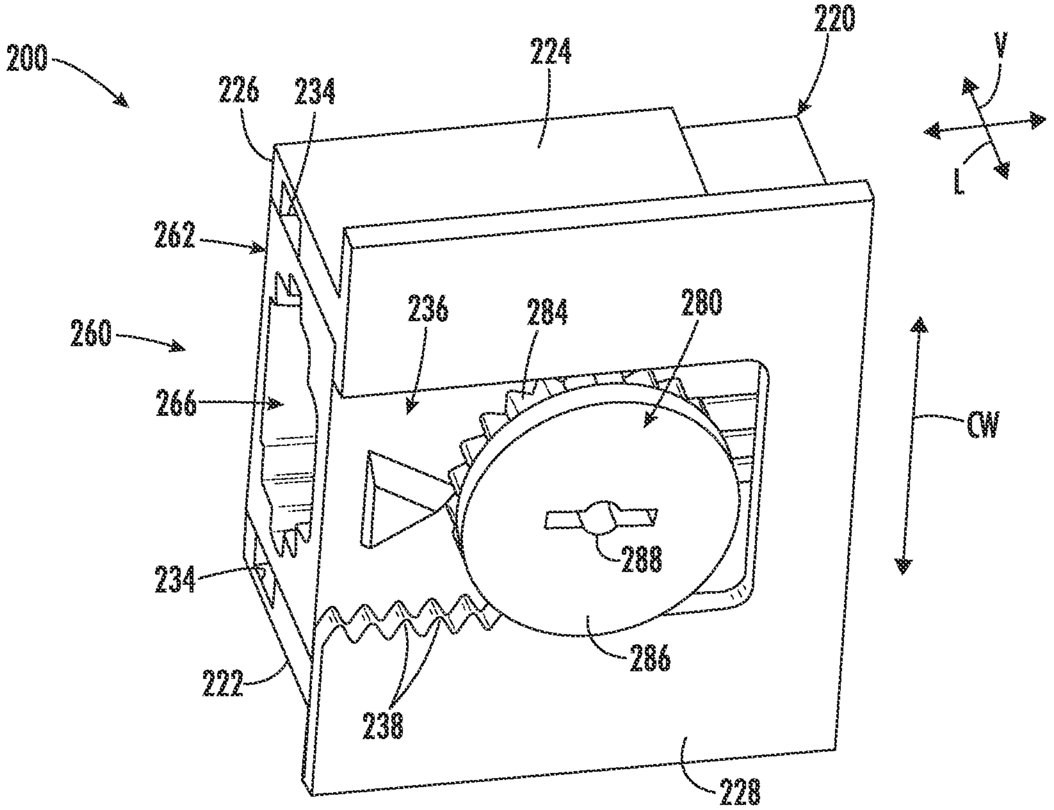
FIG. 29 illustrates s bottom perspective view of the leveling assembly shown in FIG. 25.

Referring now to FIGS. 25-29, several views of one embodiment of the leveling assembly 200 described above with reference to FIG. 24 are illustrated in accordance with aspects of the present subject matter. Specifically, FIGS. 25 and 26 illustrate top perspective views of the leveling assembly 200 in a fully retracted state (FIG. 25) and in a fully expanded state (FIG. 26). FIGS. 27 and 28 illustrate cross-sectional views of the leveling assembly 200 shown in FIGS. 25 and 26, respectively, taken about lines 27-27 (FIG. 25) and 28-28 (FIG. 26), with the leveling assembly 200 being shown as installed within an associated bottom rail (e.g., the rail 34' of the covering 30' shown in FIG. 24). Additionally, FIG. 29 illustrates a bottom perspective view of the leveling assembly 200 shown in FIG. 25, particularly illustrating adjustment features of the leveling assembly 200 for expanding and retracting the assembly 200 to adjust the levelness of the bottom rail 34'. For purposes of discussion, the leveling assembly 200 of FIGS. 25-29 will generally be described with reference to the covering 30' shown in FIG. 24. However, it should be appreciated that the leveling assembly 200 may generally be utilized to adjust the levelness or skew angle of a bottom rail having any other suitable rail configuration and may generally be utilized in association with any other suitable covering having any other suitable covering configuration.

As shown in the illustrated embodiment, the leveling assembly 200 includes both a first leveling component or cord cradle 220 configured to be movable or slidable laterally within the bottom rail 34' and a second leveling component or rail insert 260 configured to be coupled to a portion of the bottom rail 34' such that the rail insert 260 is fixed or non-movable relative to the bottom rail 34' in the lateral direction L. As will be described in greater detail below, the leveling assembly 200 utilizes a rack-and-pinion-type actuation mechanism to adjust the lateral position of the cord cradle 220 relative to the rail insert 260, thereby expanding or retracting the leveling assembly 200 within the bottom rail 34' in the lateral direction L to increase or decrease, respectively, the travel cord length of the associated lift cord (e.g., the second lift cord 64'). Specifically, FIG. 25 illustrates the leveling assembly 200 in a fully retracted position, at which the cord path of the lift cord 64' (see FIG. 27) through the leveling assembly 200 is minimized to shorten the travel cord length 82' (FIG. 24) of the cord 64' (and, thus, increase the effective length 84' (FIG. 24). In contrast, FIG. 26 illustrates the leveling assembly 200 in a fully expanded position, at which the cord path of the lift cord 64' (see FIG. 28) through the leveling assembly 200 is maximized to increase the travel cord length 82' (FIG. 24) of the cord 64' (and, thus, decrease the effective length 84' (FIG. 24).

As shown in FIGS. 25-28, the cord cradle 220 generally has a hollow, box-like configuration formed by first and second vertically extending sidewalls 222, 224 and top and bottom walls 226, 228 extending in the crosswise direction CW between the first and second sidewalls 222, 224. As particularly shown in FIG. 26, the sidewalls 222, 224 are spaced apart from one another by a crosswise distance 230 such that a cavity 232 is defined between the sidewalls 222, 224 within the interior of the cord cradle 220 for receiving the rail insert 260. Specifically, as shown in FIGS. 25 and 26, as the leveling assembly 200 is expanded and retracted, the cord cradle 220 is configured to slide laterally relative to the rail insert 260 such that less of the rail insert 260 is received within the cavity 232 as the leveling assembly 200 is expanded and more of the rail insert 260 is received within the cavity 232 as the leveling assembly 200 is retracted. Additionally, in several embodiments, the cord cradle 220 includes alignment features for maintaining proper alignment between the cord cradle 220 and the rail insert 260 as the cradle 220 is moved or slid laterally relative to the insert 26. For instance, as shown in FIGS. 25 and 26, the cord cradle 220 includes laterally extending guide channels 234 defined in the sidewalls 222, 224 for receiving corresponding guide projections 264 of the rail insert 260. Thus, as the cord cradle 220 is moved relative to the rail insert 260, the cradle 220 may be guided laterally along opposed sides of the rail insert 260 via the engagement of the guide projections 264 within the guide channels 234.

Referring still to FIGS. 25-29, the rail insert 260 of the leveling assembly 200 includes both a cradle portion 262 and an actuation member 280 configured to be rotatably coupled to the cradle portion 262 to allow the actuation member 280 to be rotated relative to the cradle portion 262. As particularly shown in FIGS. 25 and 26, the cradle portion 262 generally has a hollow, box-like configuration. For instance, in the illustrated embodiment, the cradle portion 262 is generally configured as a rectangular-shaped box having suitable cross-wise dimensions for allowing the cradle portion 262 to be received within the cavity 232 of the cord cradle 220, with the guide projections 264 of the rail insert 260 extending outwardly from opposed sides of the cradle portion 262 in the crosswise direction CW for receipt in the corresponding guide channels 234 defined by the cord cradle 220. In addition, the cradle portion 262 may be configured to define one or more cord openings for receiving the associated lift cord 64'. For instance, as shown FIGS. 25-28, the cradle portion 262 defines a first cord opening 266 through which the lift cord 64' is configured to be received as the cord 64' extends laterally between the leveling assembly 200 and the motor 60' (FIG. 24). In addition, the cradle portion 262 defines a second cord opening 268 through which the lift cord 64' is configured to be received as the cord 64' extends vertically between the leveling assembly 200 and the adjacent cord exit location 76' (FIGS. 27 and 28) defined by the bottom rail 34'. In this regard, it should be appreciated that, in one embodiment, the leveling assembly 200 may be configured to be installed within the bottom rail 34' such that the second cord opening 268 is generally aligned with the respective exit location 76' for the lift cord 64; (e.g., as shown in FIGS. 27 and 28) such that the lift cord 64' has a substantially vertical orientation as the cord 64' extends from the leveling assembly 200 towards the headrail 32' (FIG. 24).

The actuation member 280 of the rail insert 260 is generally be configured to be rotated relative to both the cradle portion 262 of the rail insert 260 and the cord cradle 220 about an axis of rotation 282 (FIGS. 27 and 28) to the allow the leveling assembly 200 to be expanded and retracted. For instance, as indicated above, the leveling assembly 200 may incorporate a rack-and-pinion type actuation mechanism for adjusting the lateral position of the cord cradle 220 relative to the rail insert 260, thereby expanding or retracting the leveling assembly 200. In this regard, the actuation member 280 of the rail insert 260 may include a pinion gear or drive gear 284 configured to engage a corresponding rack gear formed by the cord cradle 220. For example, as particularly shown in FIG. 29, the bottom wall 228 of the cord cradle 220 defines a laterally extending adjustment slot 236 including gear teeth 238 projecting into the slot 236. In such an embodiment, the gear teeth 238 may be configured to engage the drive gear 284 of the actuation member 280 of the rail insert 260 such that rotation of the drive gear 284 relative to the cord cradle 220 about its axis of rotation 282 results in actuation of the cord cradle 220 in the lateral direction L via the meshing engagement between the drive gear 284 and the gear teeth 238 of the cradle 220.

As shown in FIGS. 27-29, a portion of the actuation member 280 of the rail insert 260 (e.g., a bottom end 286 of the drive gear 284) may be configured to be received within and extend through a correspondingly shaped rail opening 51' (FIGS. 27 and 28) defined in the bottom wall 35' of the bottom rail 34'. As a result, the actuation member 280 may be accessible along the exterior of the bottom rail 34', thereby allowing the actuation member 280 to be rotated about its axis of rotation 282 for adjusting the lateral positioning of the cord cradle 220 relative to the insert 260. For instance, as shown in FIG. 29, the actuation member 280 may include an engagement feature, such as an engagement slot 288 defined along the bottom end 286 of the drive gear 284, configured to allow a suitable tool to be coupled to the drive gear 284 for rotating the actuation member 280 relative to the cord cradle 220. For instance, a correspondingly shaped end of the tool (e.g., a flat head screwdriver) may be inserted within the engagement slot 288 and rotated clockwise or counter-clockwise to cause corresponding rotation of the actuation member 280. Additionally, as shown in FIGS. 27 and 28, the actuation member 280 further includes a cradle tab or connection portion 290 extending outwardly from a top end 287 of the drive gear 284 for rotatably coupling the actuation member 280 to the cradle portion 262 of the rail insert 260. For instance, as shown in the illustrated embodiment, the cradle connection portion 290 is configured to be received within and extend through a corresponding opening 270 (FIGS. 27 and 28) defined in the cradle portion 262 to rotatably couple the actuation member 280 to the cradle portion 262, thereby vertically retaining the actuation member 280 relative to the cradle portion 262 while still allowing the actuation member 280 to be rotated about its rotational axis 282 relative to the cradle portion 262.

Additionally, as described above with reference to FIG. 24, the leveling assembly 200 may also include cord posts around which the associated lift cord 64' extends as the cord 64' travels through the leveling assembly 100. For instance, as particularly shown in FIGS. 27 and 28, the cord cradle 220 is configured to support a first cord post 202 extending crosswise between the opposed sidewalls 222, 224 of the cradle 220 and the rail insert 260 is configured to support a second cord post 204 (e.g., within the cradle portion 262 at a location generally aligned with the second cord opening 268). Each cord post 202, 204 may include, for example, a fixed roller shaft 206 and a roller 208 rotatably mounted on the shaft 206 to allow the roller 208 to rotated relative to the shaft 206 as the lift cord 64' wraps around the roller 208. As shown in FIGS. 27 and 28, the first and second cord posts 202, 204 are spaced apart laterally by a lateral spacing distance 210, with the second cord post 204 configured to be positioned closer to the motor 60 (FIG. 24) than the first cord post 202.

In the illustrated embodiment, the associated lift cord 64' is configured to wrap around the first and second cord posts 202, 204 along a serpentine-like travel path. Specifically, as shown in FIGS. 27 and 28, the lift cord 64' is configured to enter the leveling assembly 200 from the motor 60 (FIG. 24) via the first cord opening 266 defined in the cradle portion 262 and extend laterally therein to the first cord post 202, at which point the lift cord 64' partially wraps around the roller 208 of the first cord post 202 before extending laterally in the opposite direction to the second cord post 204. As shown in FIGS. 27 and 28, the lift cord 64' then wraps partially around the roller 208 of the second cord post 204 and extends vertically through both the second cord opening 268 of the cradle portion 262 (thereby exiting the leveling assembly 200) and the aligned cord exit location 76' defined by the bottom rail 34 towards the headrail 32 (FIG. 24). With such a configuration, by varying the lateral spacing distance 210 defined between the first and second cord posts 202, 204, the corresponding cord travel length 82' (FIG. 24) along which the associated lift cord 64' extends within the bottom rail 34 can be adjusted. Specifically, by rotating the actuation member 280 of the rail insert 260 in one direction such that the cord cradle 220 slides laterally relative to the rail insert 260 to move the leveling assembly 200 towards the fully retracted state (e.g., as shown in FIG. 27), the lateral spacing distance 210 defined between the first and second cord posts 202, 204 may be reduced, thereby resulting in a reduction in the cord travel length for the lift cord 64' within the bottom rail 34' (and, thus, an increase in the effective cord length 84' (FIG. 24) for the lift cord 64'). Similarly, by rotating the actuation member 280 in the opposed direction such that the cord cradle 220 slides laterally relative to the rail insert 260 to move the leveling assembly 200 towards the fully expanded state (e.g., as shown in FIG. 28), the lateral spacing distance 210 defined between the first and second cord posts 202, 204 may be increased, thereby resulting in an increase in the cord travel length for the lift cord 64' within the bottom rail 34' (and, thus, an reduction in the effective cord length 84' (FIG. 24) for the lift cord 64'). Accordingly, the cord lengths 82', 84' may be adjusted, as desired, to vary the position of the adjacent lateral end 46' of the bottom rail 34' relative to the headrail 32', which, in turn, results in a corresponding adjustment in the levelness or skew angle of the bottom rail 34'.

While the foregoing Detailed Description and drawings represent various embodiments, it will be understood that various additions, modifications, and substitutions may be made therein without departing from the spirit and scope of the present disclosure. Each example is provided by way of explanation without intent to limit the broad concepts of the present disclosure. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present disclosure covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present disclosure. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present disclosure being indicated by the appended claims, and not limited to the foregoing description.

It should also be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. Independent concepts can be used in any configuration as may be appreciated by one ordinary skill in the art. For instance, concepts or features illustrated or described as part of one embodiment can be used separately, or with another embodiment to yield a still further embodiment. Thus, it is intended that the present disclosure covers such modifications and variations as come within the scope of the appended claims and their equivalents.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present disclosure, and/or serve to distinguish regions of the associated elements from one another, and do not limit the associated element, particularly as to the position, orientation, or use of the present disclosure. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present disclosure. These examples are not the only way to implement these principles but are merely examples. Thus, references to elements or structures or features in the drawings must be appreciated as references to examples of embodiments of the present disclosure, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. A covering for an architectural structure, the covering comprising:

a headrail;

a bottom rail extending in a lateral direction between a first lateral end of the bottom rail and a second lateral end of the bottom rail, the bottom rail being suspended relative to the headrail via first and second lift cords, the first lift cord defining a first effective cord length between the headrail and the bottom rail, and the second lift cord defining a second effective cord length between the headrail and the bottom rail;

a lift system component positioned within one of the bottom rail or the headrail; and a leveling assembly positioned at least partially within the one of the bottom rail or the headrail, the leveling assembly including a slide coupled to the lift system component and a rail insert supported relative to the one of the bottom rail or the headrail, the rail insert being configured to engage the slide such that rotation of at least a portion of the rail insert relative to the slide results in a lateral position of the lift system component being adjusted within the one of the bottom rail or the headrail;

wherein the lift system component is coupled to the first and second lift cords such that, as the lateral position of the lift system component is adjusted within the one of the bottom rail or the headrail, one of the first effective cord length or the second effective cord length is shortened and the other of the first effective cord length or the second effective cord length is lengthened to adjust an orientation of the bottom rail.

2. The covering of claim 1, wherein a portion of the rail insert is accessible along an exterior of the one of the bottom rail or the headrail to allow for rotation of the at least a portion of the rail insert about a rotational axis.

3. The covering of claim 2, wherein the portion of the rail insert defines an engagement slot configured to allow a tool to be inserted therein for rotating the at least a portion of the rail insert about the rotational axis.

4. The covering of claim 1, wherein the rail insert is configured as a cam-type actuator.

5. The covering of claim 1, wherein the rail insert comprises a cam supported relative to the one of the bottom rail or the headrail for rotation relative thereto about a rotational axis, the cam being configured to engage the slide such that rotation of the cam relative to the slide results in the lateral position of the lift system component being adjusted.

6. The covering of claim 5, wherein a portion of the cam is accessible along an exterior of the one of the bottom rail or the headrail to allow the cam to be rotated about the rotational axis.

7. The covering of claim 6, wherein the portion of the cam defines an engagement slot configured to allow a tool to be inserted therein for rotating the cam about the rotational axis.

8. The covering of claim 5, wherein the cam includes an engagement post radially offset from the rotational axis that is configured to engage the slide as the cam is being rotated about the rotational axis.

9. The covering of claim 8, wherein the engagement post is configured to be received within a corresponding adjustment slot defined by an actuation plate of the slide.

10. The covering of claim 9, wherein the engagement post includes retention wings configured to engage a portion of the actuation plate to vertically retain the engagement post within the adjustment slot.

11. The covering of claim 5, wherein the rail insert further comprises a mounting plate coupled to the one of the bottom rail or the headrail, the cam being supported by the mounting plate for rotation about the rotational axis.

12. The covering of claim 1, wherein the rail insert is configured as a rack-and-pinion actuator.

13. The covering of claim 1, wherein a portion of the slide forms a rack gear configured to engage a corresponding drive gear of the rail insert.

14. The covering of claim 13, wherein the portion of the slide comprises an actuation plate defining an actuation slot, the actuation plate including gear teeth projecting into the actuation slot for engaging the drive gear of the rail insert.

15. The covering of claim 14, wherein the rail insert further comprises an annular lip provided along one side of the drive gear, the annular lip being configured to engage a portion of the actuation plate to vertically retain the rail insert relative to the slide.

16. The covering of claim 14, wherein the rail insert further comprises an adjustment post extending outwardly from the drive gear, the adjustment post being accessible along an exterior of the one of the bottom rail or the headrail to allow the drive gear to be rotated about a rotational axis.

17. The covering of claim 16, wherein the adjustment post is configured to be engaged with a tool for rotating the drive gear about the rotational axis.

18. The covering of claim 1, wherein the first and second effective cord lengths are varied to adjust a skew angle of the bottom rail relative to a horizontal reference plane.

19. The covering of claim 1, wherein the lift system component comprises a motor.

20. The covering of claim 1, wherein the lift system component is positioned within the bottom rail.

21. The covering of claim 1, wherein the at least a portion of the rail insert rotates relative to the slide about a rotational axis extending perpendicular to the lateral direction.

* * * * *